United States Patent
Smoot et al.

(10) Patent No.: US 10,092,850 B1
(45) Date of Patent: Oct. 9, 2018

(54) ROBOTIC BOUNCING BALL

(71) Applicants: DISNEY ENTERPRISES, INC., Burbank, CA (US); THE CALIFORNIA INSTITUTE OF TECHNOLOGY, Pasadena, CA (US)

(72) Inventors: Lanny S. Smoot, Thousand Oaks, CA (US); Gunter D. Niemeyer, Pasadena, CA (US); Aaron D. Ames, Pasadena, CA (US); David Loyal Christensen, Glendale, CA (US)

(73) Assignees: Disney Enterprises, Inc., Burbank, CA (US); The California Institute of Technology, Pasadena, CA (US)

( * ) Notice: Subject to any disclaimer, the term of this patent is extended or adjusted under 35 U.S.C. 154(b) by 0 days.

(21) Appl. No.: 15/648,174

(22) Filed: Jul. 12, 2017

(51) Int. Cl.
| | |
|---|---|
| *H02K 41/02* | (2006.01) |
| *A63H 29/22* | (2006.01) |
| *A63B 43/00* | (2006.01) |
| *A63H 11/00* | (2006.01) |
| *B25J 11/00* | (2006.01) |

(52) U.S. Cl.
CPC ............. *A63H 29/22* (2013.01); *A63B 43/00* (2013.01); *A63H 11/00* (2013.01); *B25J 11/00* (2013.01)

(58) Field of Classification Search
CPC ....... B25J 5/00; B25J 9/22; B25J 15/02; B25J 9/18; G05B 19/04; B64C 13/18; G05D 1/08; H02P 1/00; H02P 6/00; H02P 1/46; H02P 3/18; H02P 23/00; H02P 27/00; H02K 41/00; H02K 41/02
USPC ...... 318/568.11, 568.12, 568.2, 585, 400.01, 318/700, 701, 727, 799, 135; 700/245, 700/261; 901/1, 23, 30, 32, 36
See application file for complete search history.

(56) References Cited

U.S. PATENT DOCUMENTS

| | | | |
|---|---|---|---|
| 8,099,189 B2 * | 1/2012 | Kaznov .................. | A63H 11/00 318/568.12 |
| 2008/0097644 A1 * | 4/2008 | Kaznov .................. | A63H 11/00 700/245 |

* cited by examiner

*Primary Examiner* — Antony M Paul
(74) *Attorney, Agent, or Firm* — Marsh Fischmann & Breyfogle LLP; Kent A. Lembke

(57) ABSTRACT

A robot with an elastic, spherically-shaped body with controlled bouncing locomotion. This robot may be called "a robotic bouncing ball." The robotic bouncing ball can be used to provide a new class of robotic characters that are ball-like, and these new robotic characters bounce in place and from one location to another. The spherical body will typically be formed with a thin wall of elastic material such as a rubber or the like, and a drive or actuator assembly along with a local controller and a power source are positioned in the interior space of the hollow body. The controller controls the drive assembly to cause the spherical body to bounce up and down vertically and to provide horizontal/lateral movement of the spherical body through the applications of deforming and/or reforming forces on the elastic outer wall.

30 Claims, 20 Drawing Sheets

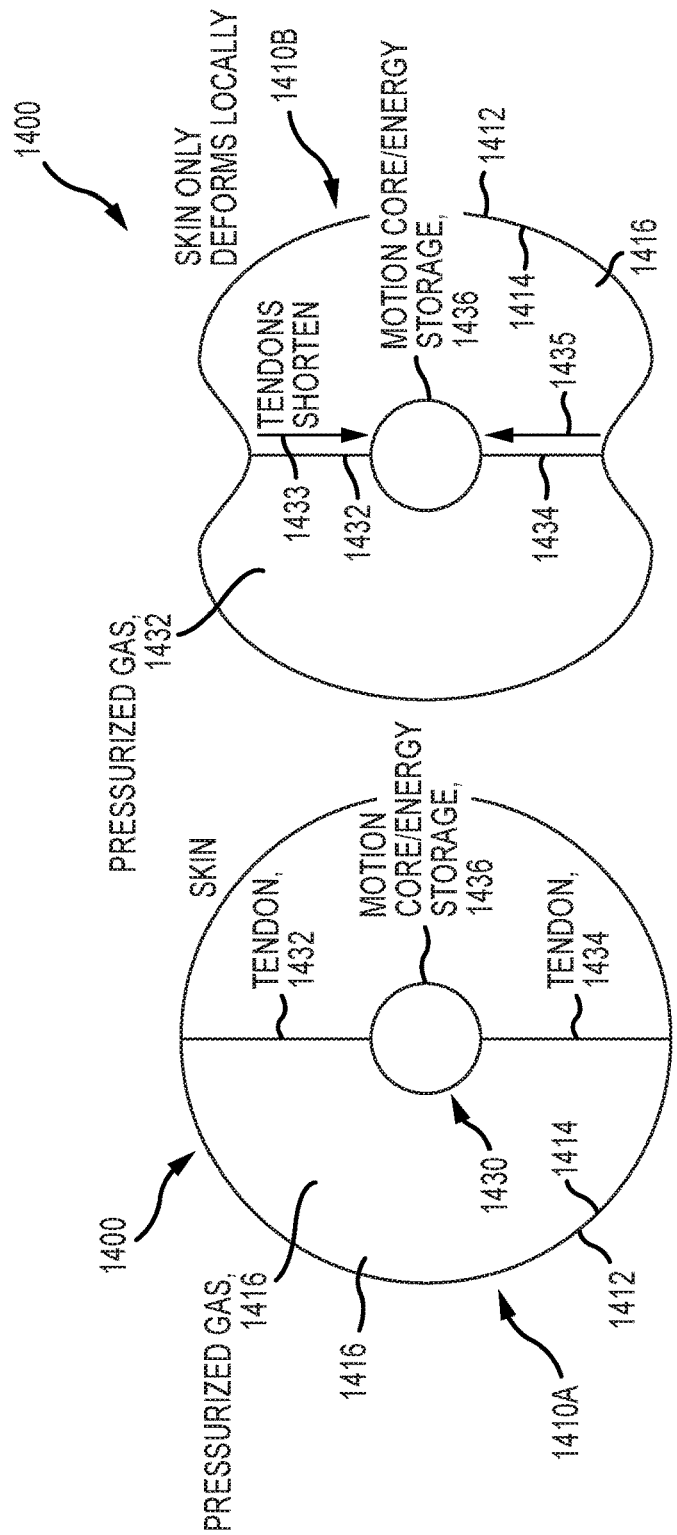

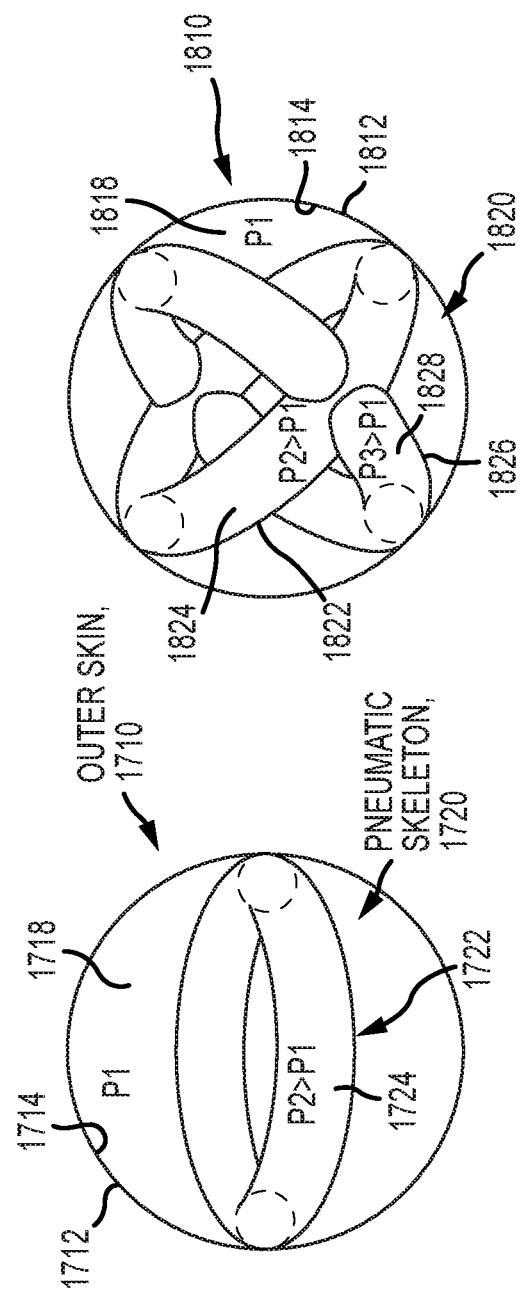

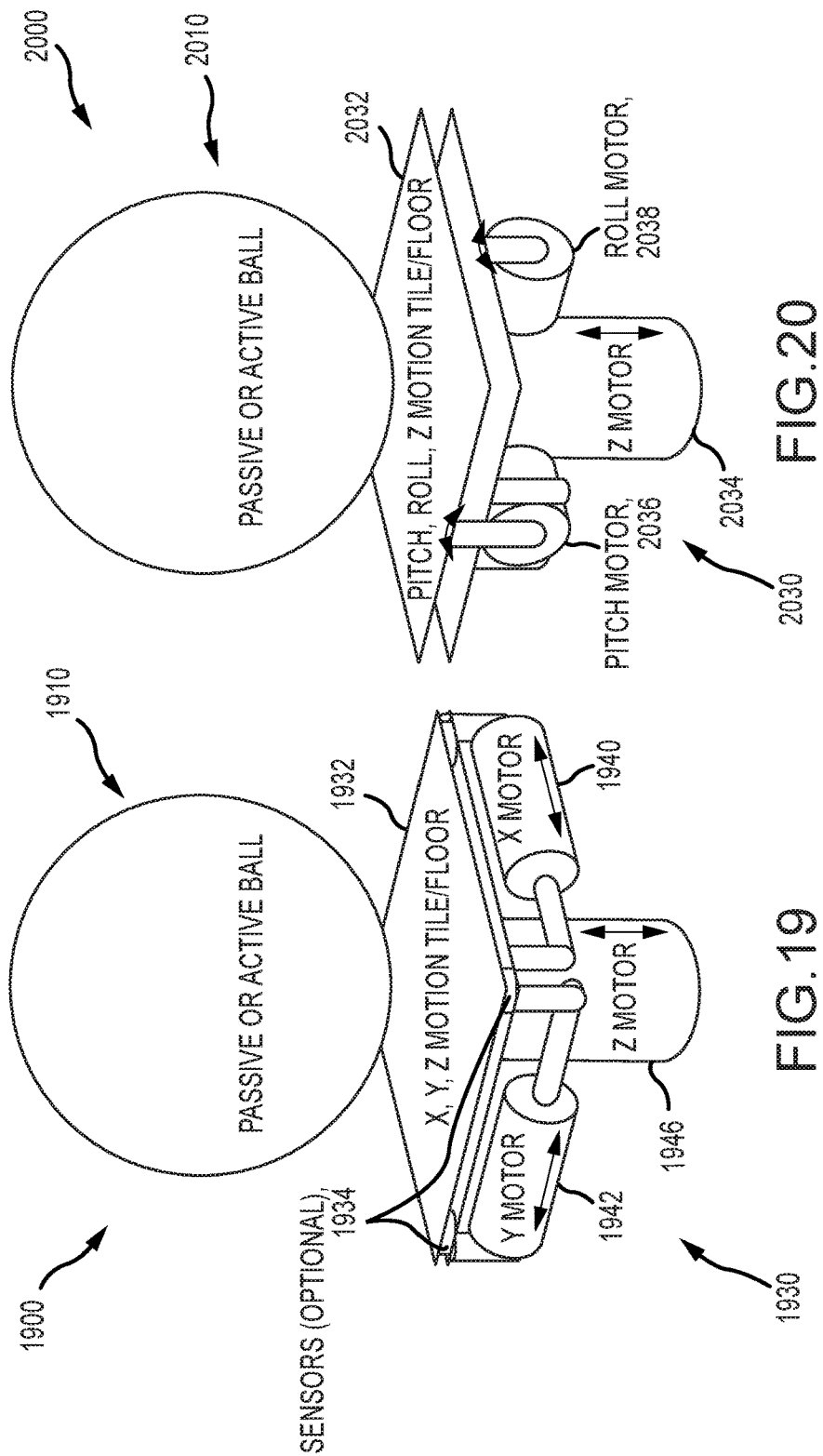

US 10,092,850 B1

ROBOTIC BOUNCING BALL

BACKGROUND

1. Field of the Description

The present description relates, in general, to robots and robotic devices having locomotion and, more particularly, to a robot with a spherical body (or a "robotic bouncing ball") with controllable locomotion including a controllable amount of bounce or movement in the Z-direction (vertical movement) or bouncing to a selectable height. The robotic bouncing ball is also preferably steerable in desired X and Y directions (lateral or horizontal movement).

2. Relevant Background

Robotics is a rapidly expanding branch of engineering and science that includes mechanical engineering, electrical engineering, and other disciplines. Robotics involves the design, construction, operation, and use of robots as well as computer systems, sensory feedback, and information processing to allow proper control of these robots. Often, those who work in robotics are developing robots that are designed to act and behave similar to humans and can be substituted for humans such as in dangerous environments or to perform highly repetitive tasks in a way that is humanlike.

In other cases, though, there are demands for robots that do not look, move, or behave like a human. For example, there has been for demand for robots and robotic characters with novel appearance and that use unusual or even difficult to recognize methods of locomotion. These robots can be used for entertainment in settings with larger crowds or to entertain users at home. In other cases, robots with unusual or uncommon locomotion can be used to perform household or industrial tasks such as vacuuming a room.

There are many examples of robotic characters from movies and comic books that have been developed for use to entertain or for use as toys. Each of these robots has been designed to be safe to operate by and among a crowd of people. Examples include tracked robots and robots that imitate movement of an animal-based character such as a dinosaur. More recently, robots that roll about a space have been created, and these rolling robots have thrilled audiences as they roll around and have been very popular as toys for all ages.

Hence, while there has been much progress in providing robots with unusual locomotion, there will continue for the foreseeable future to be a strong demand for robots with new and unexpected novel appearance and locomotion.

SUMMARY

Briefly, the inventors recognized that a robot can be provided with an elastic and compliant, spherically-shaped body to have controlled bouncing locomotion. This robot may be thought of as "a robotic bouncing ball." The robotic bouncing ball can be used to provide a new class of robotic characters that are ball-like, but, rather than simply rolling, these new robotic characters can bounce in place and bounce from one location to another. The bouncing nature of the robotic bouncing ball will likely attract attention, entertain audiences/viewers, and be very enjoyable as a toy.

The spherical body will typically be formed with a thin wall of elastomeric material or elastic material such as a rubber or the like. A drive or actuator assembly will be positioned in the interior space of the body along with a local controller and a power source to cause the spherical body to bounce up and down vertically and to provide horizontal/lateral movement of the spherical body by selectively applying deforming and reforming/spring assist forces on the outer wall of the body. Because the body is formed of a rubbery or elastic material, the robotic bouncing ball is relatively safe, and its bounce will allow it to ford obstacles that might hinder or block a rolling or walking robot.

In some embodiments, the robotic bouncing ball is adapted to be able to vary the height of each of its bounces. Further, the robotic bouncing ball is able to plot and navigate a course either in a remotely controlled manner or with internal sensing and navigation (e.g., operations of its local controller or control system). This may involve utilizing cameras and other sensing modalities to observe and react to its environment. In some applications, a group of the robotic bouncing balls act in a coordinated way to provide a show or perform a task. In interactive settings, a person may participate with the robotic bouncing ball by, for instance, directing the robotic bouncing ball to jump through a hoop or to continue bouncing long after being dribbled by a person. In other cases, the person may instruct the robotic bouncing ball to follow them as they move about a space. The robotic bouncing ball may also include internal projection components that can be selectively operated by the controller to create an animated face or other special effects using still or video images projected (e.g., remote tracked video projection, internal illumination, or the like) onto the inner surfaces of the wall forming the spherical body, e.g., to bring a particular character to life via operations of the robotic bouncing ball. In some embodiments, the robotic bouncing ball would also be able to roll, and it would be adapted to quickly transition between these two modes of ambulation or locomotion.

More particularly, a robot is provided that is designed to have bounce-based locomotion on a support surface. The robot includes a body including an outer wall enclosing an interior space, and the outer wall includes at least a first portion formed of an elastic material such as a rubber (e.g., foam rubber), a plastic, a vinyl, or the like. The robot further includes a driver supported by a mounting element within the interior space of the body. The robot has a controller generating control signals to operate the driver to cause it to apply a first force upon the first portion of the outer wall of the body. In response to this force, the body bounces at least in a vertical direction through a range of heights above the support surface. Additionally, there may be included a "smart skin" that is compliant and includes sensors, e.g., temperature, force, and the like, to allow for richer interactions with the environment.

In some preferred embodiments, the body is spherical, and the interior space is filled with a volume of gas to inflate the body to an outer diameter in a predefined range. Typically, the robot also includes a battery supported by the mounting element in the interior space and providing power to the driver and the controller.

In some embodiments, the outer wall includes a second portion, opposite the first portion of the outer wall, formed of an elastic material (e.g., a rubber or the like). Then, the first force includes a deforming force pulling the first portion of the outer wall a distance toward a center of the interior space, and the controller further operates the driver to repeatedly apply the first force and to repeatedly release the first force during an initial stage of each of the bounces of the body. In such embodiments, the controller further operates the driver to apply a second force upon the second portion of the outer wall during a later stage of each of the bounces of the body. Further, the controller may determine a bottom of each of the bounces and synchronize the release of the first force and the applying of the second force with the bottom of each of the bounces.

In some implementations of the robot, the driver includes a connecting rod attached to the outer wall in the first portion. Then, the driver may also include a linear actuator moving the connecting rod along a linear path to apply the first force. Further, the robot can include a weight supported on the mounting element distal from the first portion and opposite the connecting rod. In such cases, the body is steered, by the controller, in a horizontal direction (e.g., in X and Y directions in addition to movement in the Z direction) relative to the support surface by at least one of selectively shifting the weight and rotating an angle of the linear actuator (e.g., changing the angle of movement of the linear actuator from vertical). Additionally, reaction wheels may be used to control the motion of the ball in the X and Y directions, thus, stabilizing the robot in these directions and allowing controllability by providing forces that act normal to the Z direction forces, and the reaction wheel stabilization paradigm could be utilized with any other techniques and/or mechanisms for achieving bouncing in the vertical direction.

In some implementations, a rod and spring in series connect the inner components to the outer wall. Additionally, a linear actuator is attached to this rod, and it moves a mass back and forth to generate force on the spring and outer wall. This design can be repeated to create a spoke like structure with a series of rod, spring, and linear actuators moving masses in all (or a desired subset) of the principle directions of motion. Such a design may be desirable as it allows for control of the jump height of the ball in the vertical (Z) direction, as well as stabilization in the X and Y direction through movement of the masses orthogonal to the vertical rods. Additionally, ideas from dynamic locomotion can be used to transition between the spokes in the air creating a forward bouncing motion mimicking different legs coming in contact with the ground when running.

In some cases, the body is spherically shaped with the interior space inflated with a gas, and the mounting element is a circular disk with an outer edge mated to an inner surface of the outer wall. In these robots, the driver may include a spring moved toward and away (such as with a linear actuator) from the circular disk toward the first portion of the outer wall by the driver. The timing of contact between the spring (and application of the spring force) may be synchronized to be concurrent with the bottom of each bounce to obtain greater heights with select ones of the bounces.

In other embodiments of the robot, the body is spherically shaped, and the outer wall further includes a second portion formed of a rigid material. In such a robot, the mounting element sealably partitions a first portion of the interior space enclosed by the first portion of the outer wall and a second portion of the interior space enclosed by the second portion of the outer wall (or the mounting element, which may be a solid disk, provides an airtight seal between a high pressure gas storage tank/area of the interior space of the body and a lower pressure area of the interior space). The second portion of the interior space is filled with a compressed gas prior to bouncing operations, and the driver includes a rapidly acting valve in the mounting element that is operated by the controller during each of the bounces to release a fraction of the compressed gas into the first portion of the interior space.

BRIEF DESCRIPTION OF THE DRAWINGS

FIGS. 14A and 14B are schematic illustrations of another embodiment of a robotic bouncing ball, in two operating states, with a drive utilizing two tendons extending from opposite sides of a centrally-positioned drive motor or the like;

FIG. 17 illustrates a spherical body/shell/skin that includes a structural support or skeleton with a single inner tube that may be utilized in any of the robotic bouncing balls described herein;

FIG. 18 illustrates a spherical body similar to that of FIG. 17 that includes at least two inner tubes to provide an inner support structure or skeleton;

FIG. 19 illustrates a ball-based system with a passive or active ball selective moved with an external drive; and FIG. 20 illustrates a ball system with an active or passive ball selectively moved by operations of an external drive with tile/floor element moved with pitch, roll, and Z motion.

DETAILED DESCRIPTION

Briefly, a robot design is described that provides a robotic bouncing ball or bouncing spherical robot that can move vertically up and down in a controlled manner (e.g., with bounce heights that may vary over time) and also move laterally or horizontally about a space with each of its bounces (e.g., the robot is steerable locally and/or remotely). The robotic bouncing ball is hollow with a rubber or other flexible or elastomeric outer wall, and one or more drivers or actuators are positioned within the interior space or void. The spherical body defined by the outer wall is inflated, and a controller is provided in the interior space/void to selectively operate the drivers/actuators to cause the robotic bouncing ball to jump or bounce to various heights and to be steered about a space.

Figure 1:
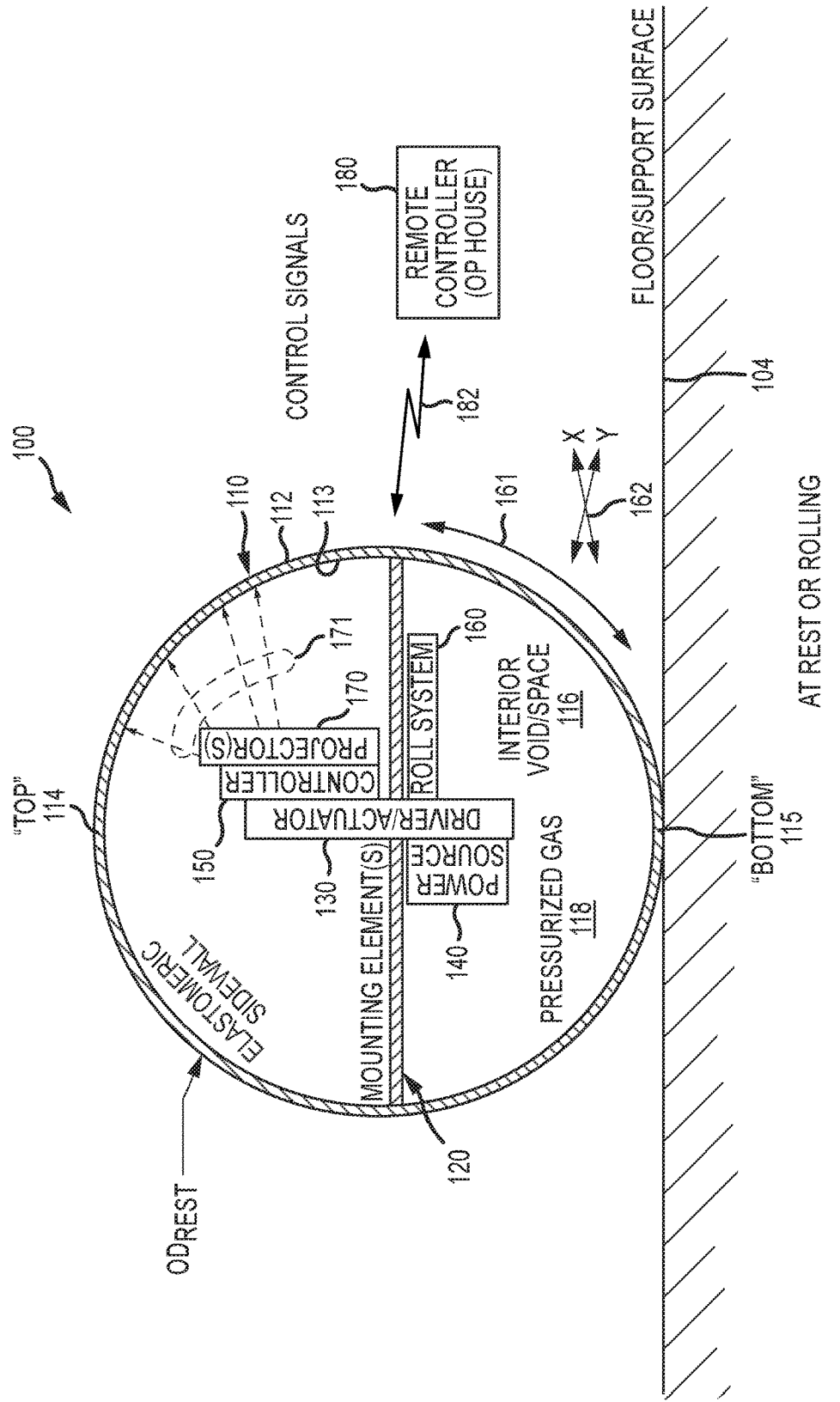
FIG. 1 is a functional block, cross-sectional diagram of a robotic bouncing ball (or spherical robot) of the present description shown in an at-rest or rolling configuration or operating state.

FIG. 1 illustrates a functional block diagram (in cross section) of an exemplary robotic bouncing ball (or robot with a spherical body) 100. The robotic bouncing ball 100 includes a spherical body 110 formed of a wall of a flexible material (such as an elastomeric material and with vinyl, plastic, rubber, solid foam rubber, and other materials being useful) with an outer surface 112 and an inner surface 113 (with a wall thickness of one sixteenth to one half inch or more being useful in most implementations). The body 110 is hollow with the inner surface 113 defining a spherical interior space or void 116. The interior void/space 116 is typically filled or inflated with a gas (such as air or the like) 118 that is pressurized (e.g., to 10 to 30 psi or the like) to inflate it to a desired outer diameter, $OD_{Rest}$ (e.g., several inches to several feet or more). For example, the body 110 may take a form similar to that of a conventional exercise ball or be formed to handle higher internal pressures, to be more rigid, or to be more less firm and/or more elastic than a typical exercise ball.

The outer diameter, $OD_{Rest}$, at rest or prior to bouncing operations are initiated may vary widely to practice the robotic bouncing ball with a range of 6 to 60 inches being suitable in many cases. The spherical body 110 includes an upper or top portion or section 114 and a lower or bottom portion 115. These semi-spherical shaped sections or portions 114, 115 are deformed during bouncing operations and are the portions of the outer wall of the body 110 upon which (typically but not necessarily) forces are applied by drive or actuator devices of the robotic bouncing ball 100.

The robotic bouncing ball 100 includes one or more mounting elements 120 within the interior space/void 116. These mounting elements 120 are attached to the inner surface 113 of the outer wall of the spherical body 110 and are adapted to support internal components of the robotic bouncing ball 100 including a driver (or actuator or drive assembly) 130. A power source 140 is provided in the space/void 116 for providing motive power (such as electricity) to the driver 130 and other components (including the controller 150, roll system 160, and projector(s) 170), and the power source 140 may take the form of a battery or the like.

The robotic bouncing ball 100 includes a controller 150 in the void/space 116, and the controller 150 may take the form of computer/electronic hardware and software that is configured to selectively provide control signals to the driver/actuator 130 to cause the robotic bouncing ball 100 to bounce (shown in FIG. 1 to be "at rest" or rolling) to provide vertical motion and also horizontal or steerable motion. The robotic bouncing ball 100 may be locally controlled by the controller 150 such as based on an operating program or software run by the controller 150 and/or may be remotely controlled/operated by a remote controller 180. The remote controller 180 is shown to communicate in a wireless manner control signals 182 to the controller 150, and the controller 150 is configured with a wireless transceiver supporting such communications and to be able to process the control signals 182 to responsively generate control signals for the driver/actuator 130.

As will explained with reference to later figures, the driver 130 is selectively operable by the controller 150 to apply a deforming force on the top or upper portion 114, and this deforming force deforms the top portion 114 (e.g., pulls it down toward the center of the space/void 116) so as to store potential energy in the outer wall of the spherical body 110. When the deforming force is removed, the top portion 114 released the stored potential energy as it elastically returns to its at-rest configuration (e.g., to its original outer diameter, $OD_{Rest}$). In some embodiments, the driver/actuator 130 is also operated in a time synchronized manner to apply a spring or restoring force to the bottom or lower portion 115 when this portion 115 of the spherical body 110 is deformed upon the robotic bouncing ball 100 landing (or at some point in the cycle of the bottom/lower portion returning to its at-rest state after being deformed by the weight of the robotic bouncing ball 100 striking the ground/floor 104 after a vertically upward jump).

The robotic bouncing ball 100 may be configured for rolling as well as bouncing motions. To this end, a roll system 160 is provided in the interior space 116 that may be selectively operated so as to cause the body 110 to roll as shown with arrow 161 to travel horizontally in selectable X and Y directions as shown with arrows 162 on the floor/support surface 104. The roll system 160 may take a wide variety of forms to implement the robotic bouncing ball 100, and it typically will be operated by the controller 150 as shown in FIG. 1 when the driver/actuator 130 is inactive so the ball 100 transitions between rolling or being at rest (body 110 not deformed) and bouncing operations. The rolling system 160 may, for example, take the form of the internal drives used in commercially available spherical rolling robots such as those available from Sphero and/or as described in U.S. Pat. Appl. Publ. Nos. 2015/0370257, 2016/0004253, and 2016/0033967 that are incorporated herein by reference. In other cases, rolling drive systems still in development may be utilized as the roll system 160 such as the magnetic-based drive described in U.S. Pat. No. 8,269,447, which is incorporated herein by reference.

Further, the robotic bouncing ball 100 is shown to include a projector(s) 170 that may be operated by the controller 150. This results in still or video images 171 being projected onto the inner surface 113 of the sidewall of the body 110. The thickness, materials, and color of the body 110 may be chosen such that the body 110 acts as a rear projection screen (at least in select segments/portions) to create a desired visual effect with operation of the projector 170 such as to cause the robot 100 to take on an appearance of a particular character or otherwise become animated.

Figure 2:
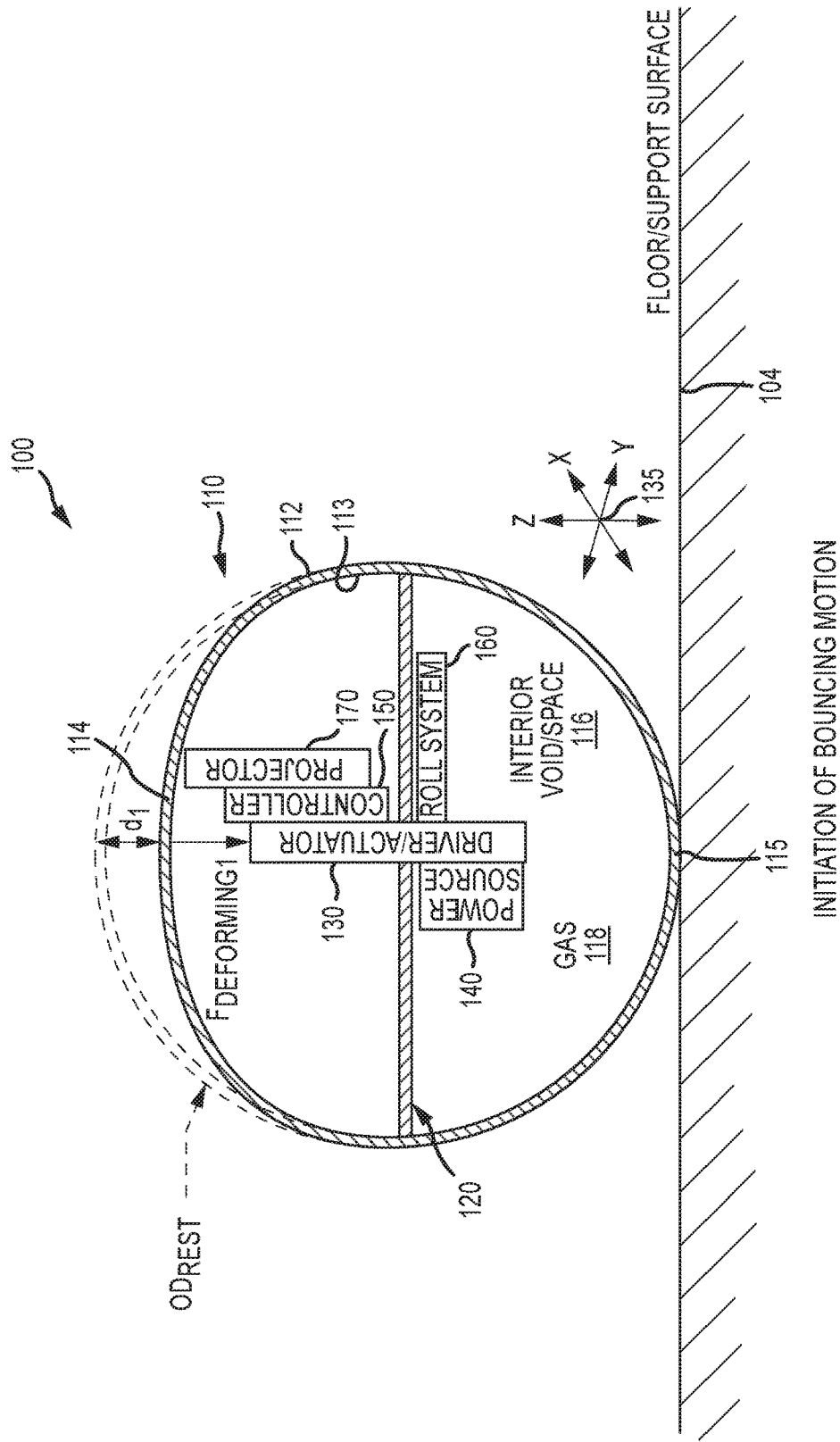
FIGS. 2-5 illustrate the robotic bouncing ball of FIG. 1 as it is operated in an initial bouncing state, a first or early jump/bounce state, a landing state, and a second or later jump/bounce state to show operations of the internal driver/actuator to provide bouncing-based locomotion for a robot.

FIGS. 2-5 illustrate the robotic bouncing ball 100 of FIG. 1 as it is operated (i.e., as the controller operates the driver/actuator 130) in an initial bouncing state, a first or early jump/bounce state, a landing state, and a second or later jump/bounce state, respectfully, to show operations of the internal driver/actuator 130 to provide bouncing-based locomotion. The locomotion may be vertical and also in horizontal directions as shown with arrows 135 relative to the floor/support surface 104. In FIG. 2, the controller 150 has initiated vertical movement of the robot 100 by transmitting a control signal to the driver/actuator 130, which responds by applying a first deforming force, $F_{Deforming1}$, to the top/upper portion of the body 110. This causes the outer wall of the spherical body 110 to be pulled down elastically a distance, $d_1$, toward the center of the spherical body 110 (i.e., the outer wall undergoes elastic deformation). By applying this downward, vertical force, $F_{Deforming1}$, the driver/actuator 130 transfers energy that is stored in the material of the top section/segment 114 of the spherical body 110 (i.e., an amount of potential energy is stored in the outer wall). The force, $F_{Deforming1}$, is applied orthogonally to the floor/support surface 104 to obtain an up and down movement or at an angle to achieve horizontal or lateral movement, with movement in any of these three directions shown with arrows 135. The magnitude of the force, $F_{Deforming1}$, may vary based on the configuration of the spherical body, with the distance, $d_1$, typically ranging from 0.5 to 6 inches or more (with 1 to 3 inches being common with a larger spherical body such as a conventional exercise-type ball).

Figure 3:
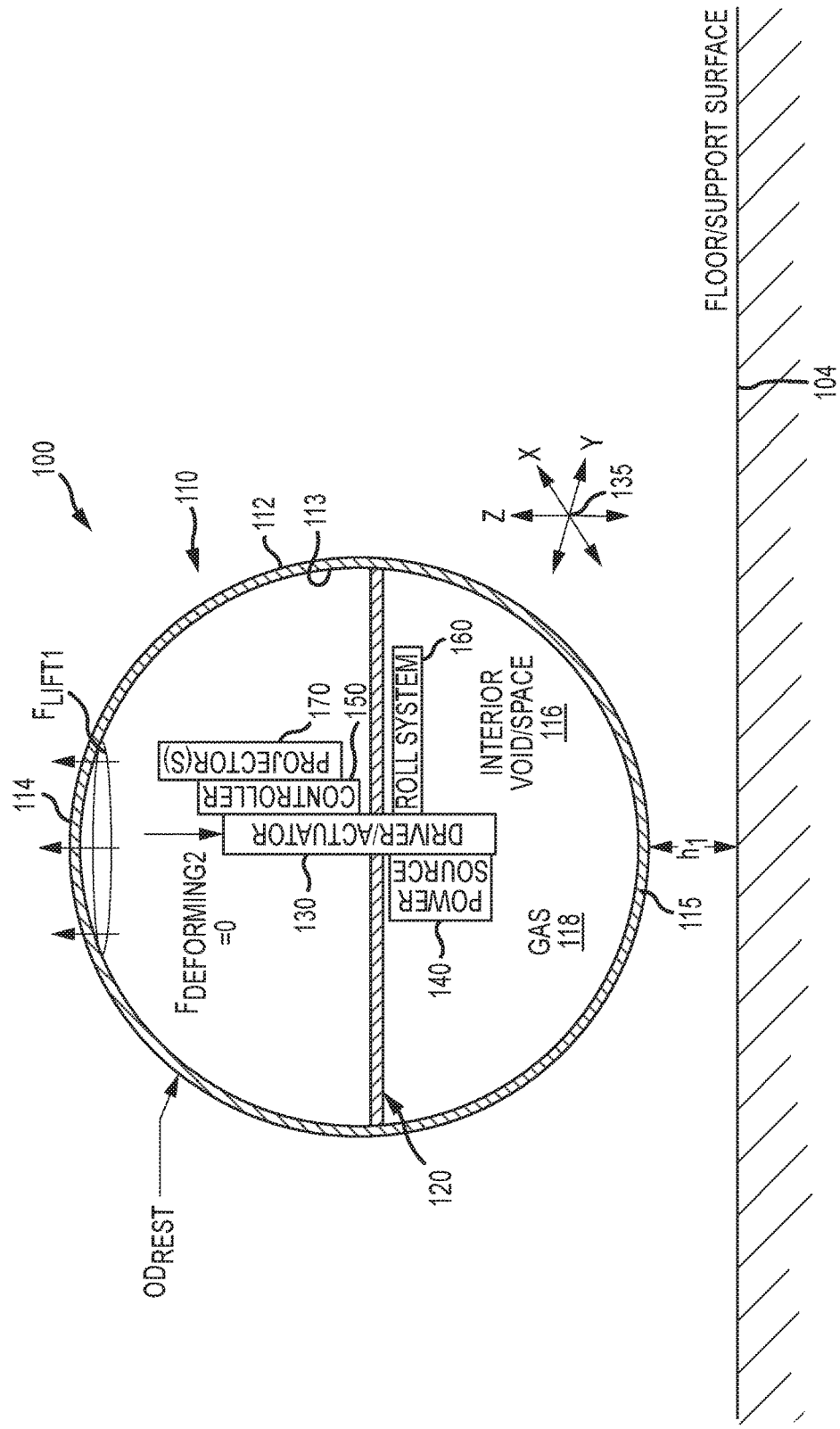

During the operating time and/or state shown in FIG. 3, the controller 150 has acted to release the top or upper portion 114 of the outer wall of the spherical body 110 so that no deforming force, $F_{Deforming1}$, is being applied. As shown, this results in the release of the previously stored potential energy in the material of the segment/portion 114 with a lifting or reforming force, $F_{Lift1}$, being applied in the area of the top/upper portion 114 and adjoining portions of the spherical body 110. This causes the spherical body 110 to return to its at-rest configuration and to jump or bounce upward (along Z-axis) from the floor/support surface to a first height, $h_1$. The magnitude of this bounce/jump will depend on numerous parameters such as the elasticity and quantity of the material in the wall segment 114, the weight of the body 110 and other components in the interior space 116, and the magnitude of the deformation force, $F_{Deforming1}$ (and/or distance, $d_1$, of deformation).

Figure 4:
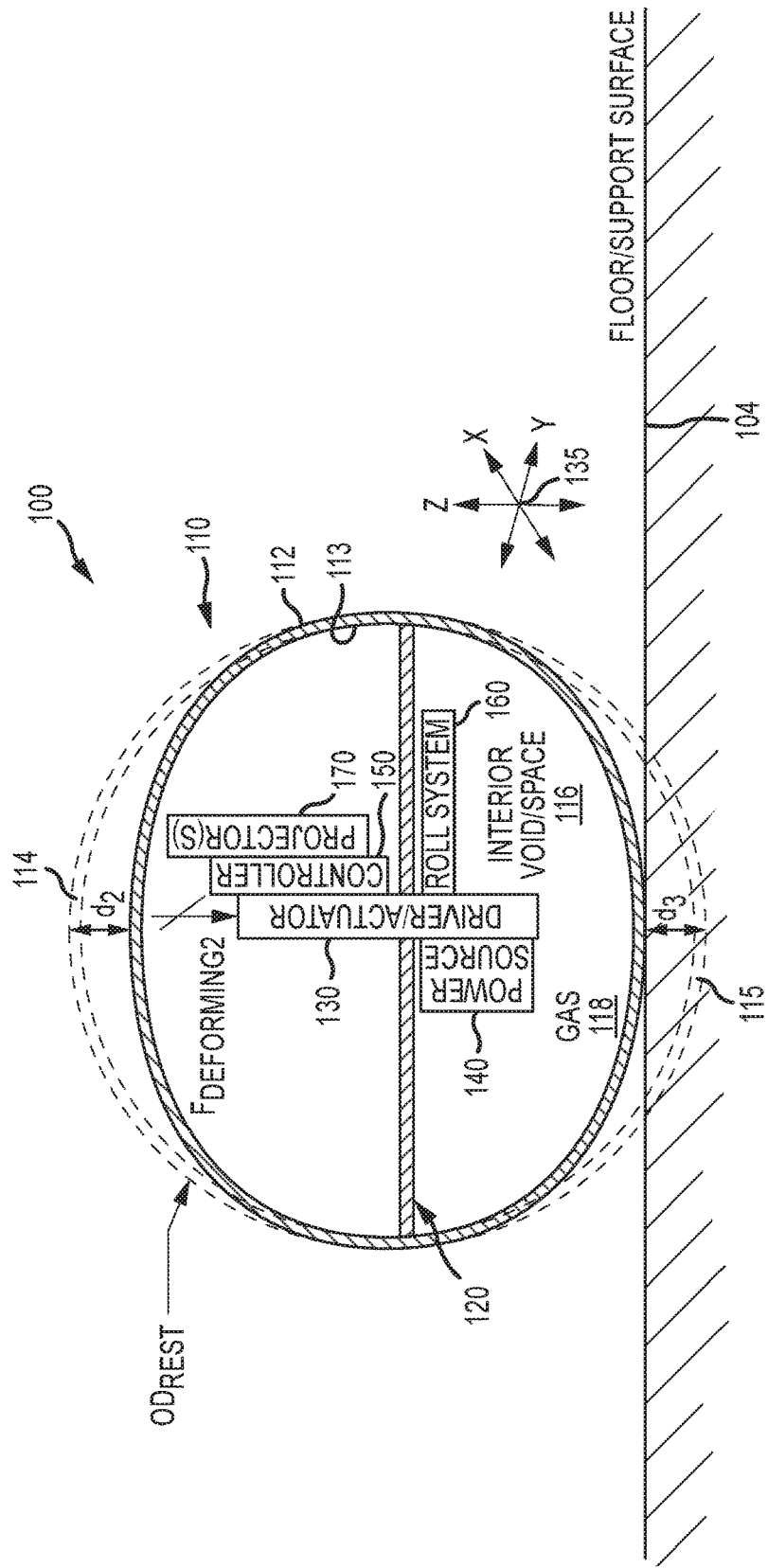

During the operating time and/or state shown in FIG. 4, the spherical body 110 has returned under gravity to the floor/supporting surface 104. The force of the landing causes the bottom/lower portion 115 of the spherical body 110 to become elastically deformed as shown with the portion 115 being pushed upward a distance, $d_3$, toward the center of the interior space 116 of the body 110. This causes an amount of potential energy to be stored in the material of the bottom/lower portion 115. The controller 150, such as via one or more sensors, identifies that the body 110 has landed and is being deformed in its lower portion 115, and, in response (as long as additional bouncing is desired by the control program or by control signals from a remote controller such as controller 180 of FIG. 1), the controller 150 generates a second control signal causing the driver/actuator 130 to apply a second deforming force, $F_{Deforming2}$, that concurrent with the deformation at the bottom segment 115 causes the top/upper portion 114 to be deformed and move a distance, $d_2$, toward the center of the interior space 116 of the spherical body 110. Again, if vertical travel alone is desired, the force, $F_{Deforming2}$, is applied orthogonally to the floor/ground 104 while it is applied at an angle from orthogonal to achieve horizontal (or X-Y) movement or steering of the robotic bouncing ball 100. The second deforming force, $F_{Deforming2}$, may be the same as or equal to the first deforming force, $F_{Deforming1}$, to achieve relatively equal bouncing heights, may be less to reduce the magnitude or height of the jump/bounce, or may be greater to achieve a larger jump/bounce.

Figure 5:
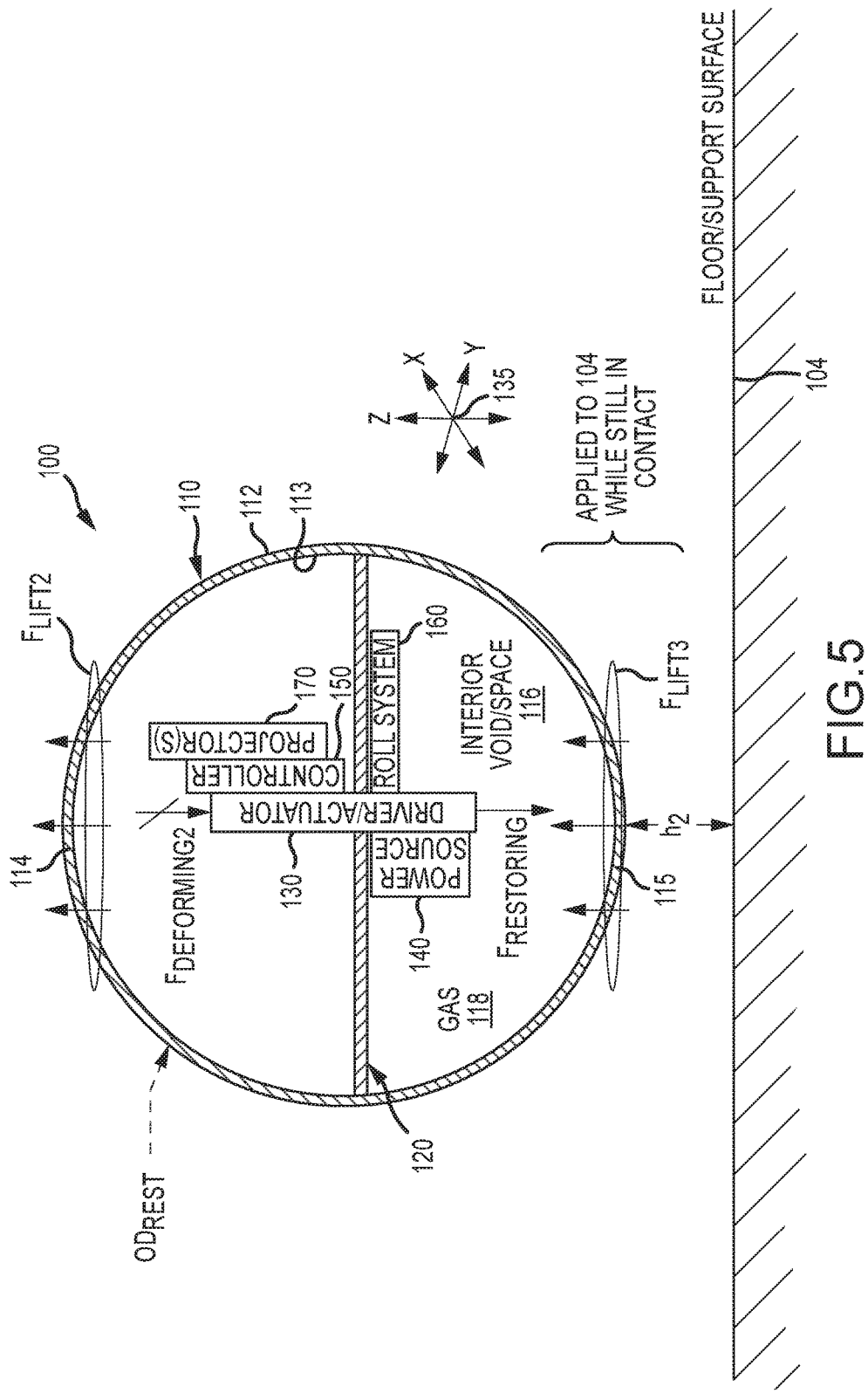

During the operating time or state shown in FIG. 5 (after state of FIG. 4), the controller 150 transmits a control signal to the driver/actuator 130 to release the application of the second deforming force, $F_{Deforming2}$. This releases the stored potential energy in the top/upper portion 114, which produces a second lifting force, $F_{Lift2}$, that is applied upon the top/upper portion 114 and adjoining portions of the spherical body 110 causing the spherical body 110 to lift vertically upward (and/or at an angle from vertical). In some embodiments, the controller 150 generates this control signal concurrently with (or immediately before or after) the release of potential energy from the bottom or lower portion 115 that provides the third lifting force, $F_{Lift3}$, that is applied on the bottom or lower portion 115 and adjoining portions of the spherical body 110 as the body 110 pushes off the floor/supporting surface 104 to bounce or jump to the second height, $h_2$ (which may be the same, less than, or greater than the first height, $h_1$, based on a number of factors including magnitude of the second deforming force, $F_{Deforming2}$). In some embodiments (with each application of a second or later deforming force or in bounces where additional height is desired), the driver/actuator 130 is concurrently operated to apply a restoring or spring force, $F_{Restoring}$, upon the lower or bottom portion 115 to assist in the restoration of the segment 115 to its at rest state and/or to push off the floor/surface 104.

As will be understood from FIGS. 1-5, a robotic bouncing ball or robot with a spherical body can be implemented generally by placing a "bouncing" mechanism (for the driver/actuator 130) inside an air-filled elastomeric ball. The bouncing mechanism or driver has a stored energy or power source such as a battery, an internal tank containing a compressed gas, or another energy source useful for creating forces inside the ball's body.

In one prototyped robotic bouncing ball, the internal drive mechanism was provided in the form of an electric motor that drove a pinion gear, which moved a lightweight plastic rack (or piston) so as to impart a rapidly deployed force (e.g., to provide the deforming forces as discussed with reference to FIGS. 1-5). This prototype driver was attached to the top portion or segment of the spherical body to pull downward and was also operated to push on the bottom of the spherical body of the ball (e.g., as timed by an internal microprocessor with an acceleration sensor (both of which would be part of the controller 150 in FIGS. 1-5)).

The thrusts of the internal drive mechanism are synchronized by the controller/microprocessor so that the maximum push occurs (or spring or restoring force) occurs at the bottom of a bounce cycle. In this manner, the push adds energy to that stored in the deformation of the bottom of the spherical body of the robotic bouncing ball. By adding a small push at just the right time, high amplitude bounces become possible and practical. Because the pusher mechanism is completely contained inside the ball's body, there are no pinch points or sharp external parts of the robotic bouncing ball.

Beside simple bouncing up and down (or purely vertical movement), steering for horizontal or X-Y directional travel is possible. For example, by tilting the end effector that pushes against the bottom of the ball's body during each bounce or select bounces (or tilting the entire internal drive mechanism) or shifting an internal ballast weight (not shown in FIGS. 1-5 but readily understood by those skilled in the arts) during each bounce or select bounces, the spherical body can be made to move in a specific direction after each bounce under internal or external/remote control.

The control mechanism or controller of the robotic bouncing ball can include an internal inertial measurement unit (IMU) to determine the spherical body's position and direction with respect to the Earth. The controller may also include sensor systems such as LIDAR, SONAR, and/or computer vision to allow the controller to determine the location of the spherical body and to allow the controller (or a remote controller) to operate the driver/actuator to move the spherical body along a particular course. Alternatively, an external system may be used to track the location/movement of the spherical body and relay location information (and/or course information) to the internal controller (or to the remote controller).

Along with direction control, bounce height is determined by the amount of energy added to each bounce of the spherical body. A bounce can also be brought to near zero height instantaneously when the drive mechanism is used to counter the resonant bouncing frequency. In such an operating state (e.g., in response to a stop bouncing control instruction from an internal program or a remote controller), the robotic bouncing ball can go from bouncing to "splat" or bottom deformation with no or little responsive bouncing as part of its stunt landing regimen. Further, multiple mechanisms inside the spherical body can be used to enable the robotic bouncing ball to respond to impacts that it makes on surfaces other than just at its bottom, and this can allow the robotic bouncing ball to ricochet in visually surprising (but controlled) ways. If vision systems are included in the controller, the spherical body may be studded with outward looking cameras whose separate fields of view are stitched together to form a continuous panorama of vision surrounding the robotic bouncing ball. The disparate views can be processed so that an operator piloting the ball remotely can receive a stable world view of the space about the robotic bouncing ball.

Figure 6:
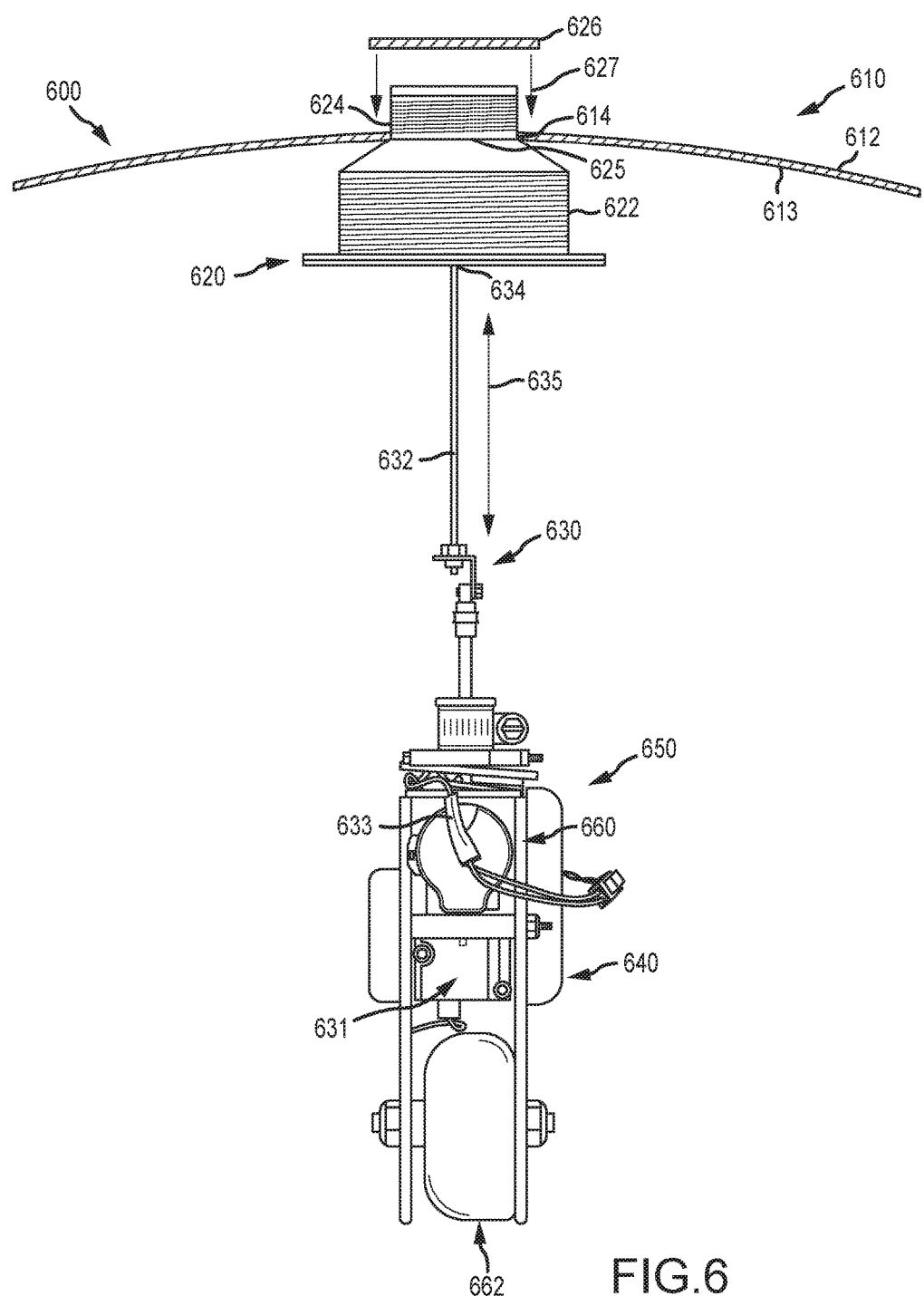
FIG. 6 is an partial exploded cross sectional view of one implementation of a robotic bouncing ball as described with reference to FIGS. 1-5.

At this point in the description, it may be useful to describe several useful embodiments for implementing a robotic bouncing ball as described above with reference to FIGS. 1-5. FIG. 6 illustrates a robotic bouncing ball 600 that was prototyped and proven to be effective in providing a robot that could be controlled to bounce at a variety of heights with an internal drive mechanism. FIG. 6 is a partial view of the robotic bouncing ball 600 that is shown as a cross section of a spherical body 610 to show internal components and partially exploded to illustrate how an airtight seal is achieved.

As shown, the robotic bouncing ball 600 includes a spherical body 610 formed of an outer wall of elastomeric material (e.g., a rubber such as may be used in an inflatable exercise ball). The spherical body 610 has an outer surface 612 that would contact a support surface such as a floor, the ground, or the like and an inner surface 613 that defines an interior void or space that is filled with a gas. In other words, the spherical body 610 is inflated with air or another gas upon assembly and prior to use.

A hole 614 has been cut through the outer wall of the spherical body 610 to provide access to the interior space or void. This hole 614 is used to provide a mounting location at the "top" or upper portion of the outer wall of the spherical body (i.e., due to the weight of the components mounted on the body 610, the hole 614 typically is oriented at the top or upward facing part of the outer surface 612). A mounting element or assembly 620 is include in the robotic bouncing ball 600 and includes a lower body 622 that is positioned within the interior space or void of the spherical body 610 and is affixed to an end 634 of a drive rod/shaft 632. The mounting element 620 further includes an upper or outer coupling portion 624 that is positioned so as to extend through and outward a distance from the hole 614 in the outer wall of the spherical body 610.

A cap or exterior coupler 626 is mated with (e.g., threaded onto) this upper/outer coupling portion 624 as shown with arrows 627, and this provides an airtight seal about the periphery of the hole 614 at a collar surface 625 between the body 622 and upper/outer coupling portion 624. With the mounting element/assembly 620 described, it will be apparent to many skilled in the art that a wide variety of configurations and designs can be provided to implement a mounting element that affixes an internal drive mechanism to an outer wall of an elastomeric spherical body so as to provide an airtight (or flow resistant) seal and to provide a force application location for deforming a top or upper portion of the spherical body 610, and the invention and robotic bouncing ball 600 is not limited to the particular mounting element 620 shown.

The robotic bouncing ball 600 further includes a driver 630 in the form of a linear actuator 631 sandwiched between two planar members of a frame 660. The linear actuator 631 is powered by a set of batteries 640 attached to outer surfaces of the planar members of the frame 660, and a controller 650 is provided for generating control signals to selectively operate the linear actuator 631 to cause the robotic bouncing ball 600 to bounce or to remain still (in an "at rest" position). The controller 650 may generate the control signals according to a control program (provide local control) and/or may generate the control signals in response to signals received from a remote controller (not shown in FIG. 6 but may take the form of controller 180 shown in FIG. 1). To provide ballast for balancing the robotic bouncing ball 600, a weight 662 is shown to be included and mounted onto the frame 660 below the linear actuator 631 (or distal to the hole 614). The weight 662 may be chosen to suit the size and weight of the spherical body 610 and/or based on the weight of the drive and mounting components. For example, the weight 662 may be in the range of 0.5 to 10 pounds or more with a 1.5 to 2.5 weight used in one prototype in which the spherical body was a conventional exercise ball.

The driver 630 further includes a drive rod/shaft 632 that is coupled at a first or lower end 633 to the linear actuator 631. A second or upper end 634 of the drive rod/shaft 632 is rigidly attached to the lower body 622 (or upper/outer portion 624) of the mounting element 620. The linear actuator 631 is operable by the controller 650 to move the drive rod 632 in a linear manner as shown with arrows 635 reciprocally toward the hole or top portion 614 of the outer wall of the spherical body 610 and toward the center of the spherical body 610 (or away from the hole/top portion 614). This causes the outer wall of the spherical body 610 to be deformed or pulled downward in a first part of the cycle/stroke 635 to store potential energy in the material of the body 610 proximate to the hole/top portion 614 and then to assist the spherical body 610 in returning to its at-rest configuration (shown in FIG. 6) while the potential energy is being released. As a result, the spherical body 610 along with the internal drive mechanism components bounce up and down at one or more heights (or in a range of heights). Steering can be achieved by causing the application of force by the drive rod/shaft upon the top portion or material by hole 614 to be at an angle from vertical (to be non-orthogonal relative to a support surface) such as by shifting of the linear actuator 631 and/or weight/ballast element 662.

Figure 7:
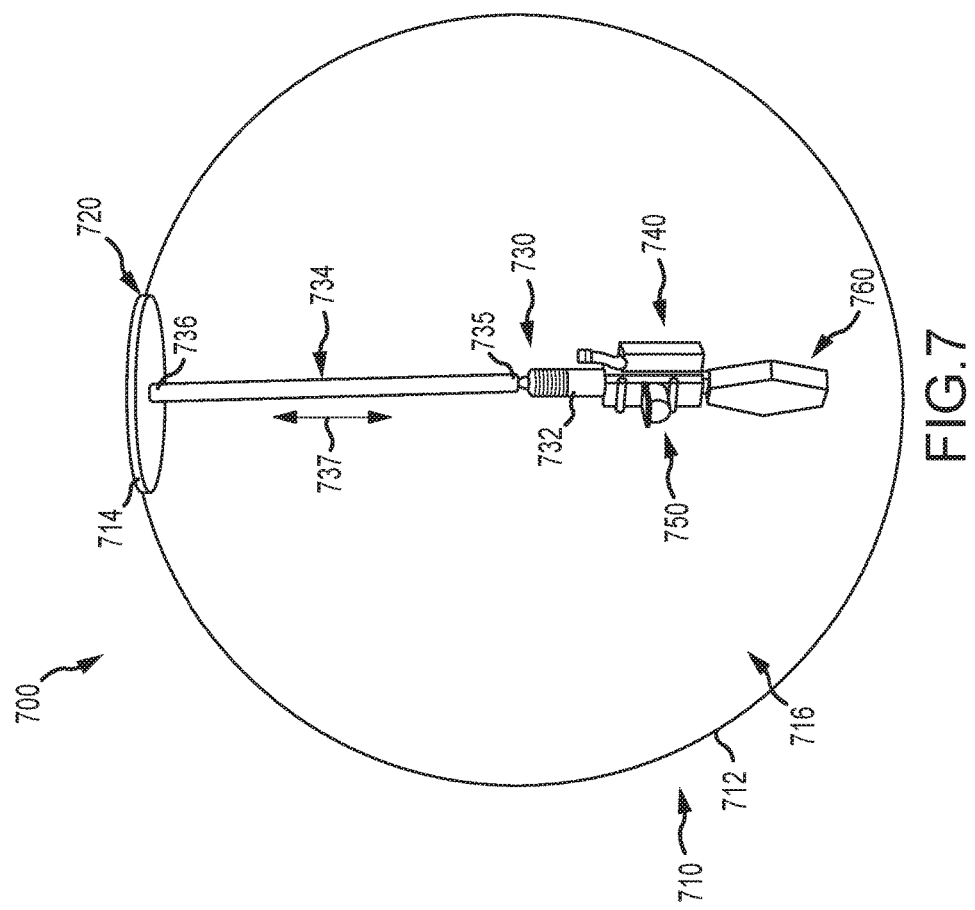
FIG. 7 illustrates an embodiment of a robotic bouncing ball similar to the embodiment shown in FIG. 6 with the spherical body shown transparent to allow viewing of internally mounted components.

FIG. 7 illustrates another embodiment of a robotic bouncing ball 700 configured similarly to the robot 600 of FIG. 6, with the spherical body 710 shown to be transparent/translucent to allow viewing of internally mounted components. As shown, the robotic bouncing ball 700 includes a spherical body 710 formed with a wall 712 of elastomeric material such as a foam or other rubber, vinyl, plastic, or the like. The interior space/void 716 defined by the outer wall 712 is filled with air or other gas so that the spherical body 710 is inflated to a desired pressure or desired/predefined outer diameter. The robotic bouncing ball 700 may be thought of as a bouncing sphere using a dangling internal weight. To this end, a mounting element 720 is provided in the form of a leak-proof (or resistant) sealing disk sealably coupled with an opening/hole 714 in the outer wall 712, and the location of the sealing disk or mounting element 720 defines the top or upper portion of the outer wall 712 of the spherical body 710 that will be deformed by action of an internal drive/actuator.

The robotic bouncing ball 700 includes an internal driver 730. The driver 730 includes a linear actuator 732 and a connecting rod 734 coupled at a first/lower end 735 to the output of the linear actuator 732 and at a second/upper end 736 to the center of the sealing disk/mounting element 720. The linear actuator 732 is operated via power from a rechargeable battery pack 740 and control signals from a controller 750. A dead weight/ballast element 760 is hung from the driver 730 (or housing of controller 750). The dead weight 760 provides mass to pull up when the sphere body 710 is bouncing such as when a bounce bottoms out.

The controller 750 may include a microprocessor with an accelerometer, and the controller 750 can be configured to detect maximum downward acceleration of the sphere body 710 during bouncing operations. This can be used to identify the bottom of each bounce. In response, the controller 750 can be adapted to control the actuator 732, such as by applying an electrical pulse to the actuator 732, to pull itself up. Particularly, as shown with arrows 737, the linear actuator 732 pulls itself up (or toward the top portion/hole 714 in the outer wall 712 of the spherical body 710 with a strong impulse, which also pulls down on the mounting element 720 and top portion of the spherical body 710 (portions of the wall 712 about the hole 714)). Navigation in horizontal or in X-Y directions rather than only in Z-direction is done in some embodiments by shifting the angle of the actuator 732 and/or by shifting the position of the dead weight 760.

Figure 8:
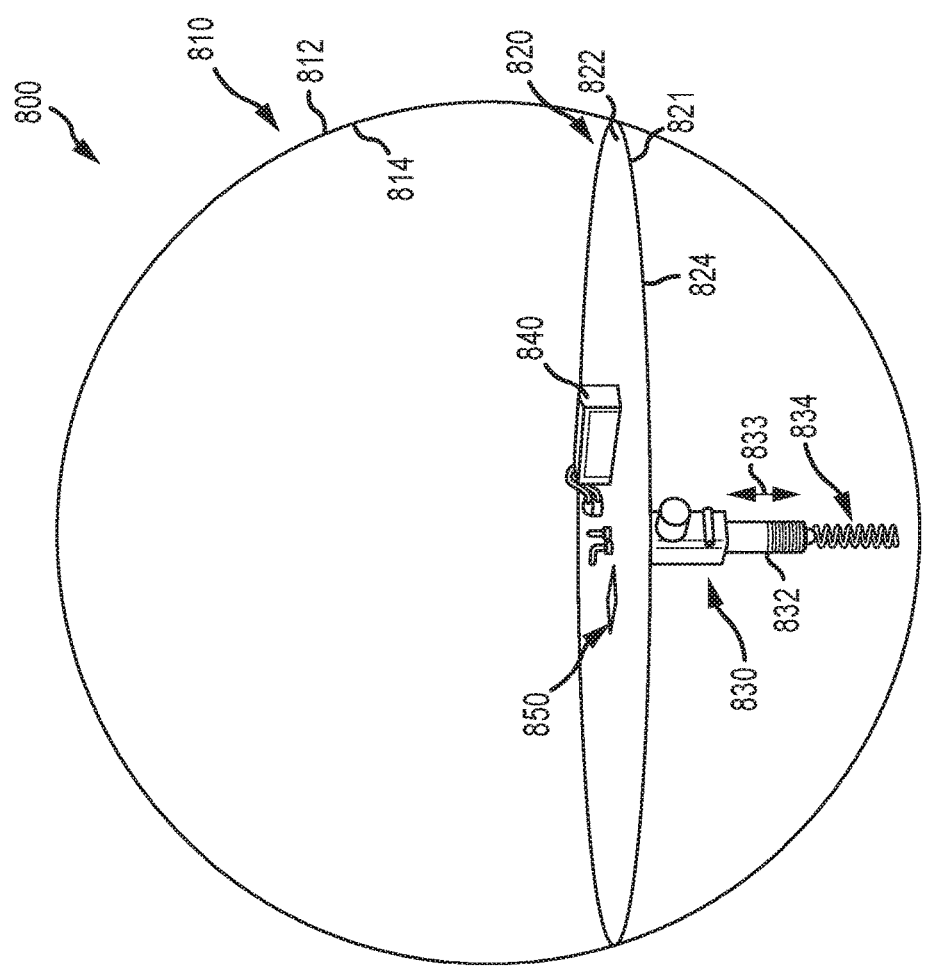
FIG. 8 illustrates an additional embodiment of a robotic bouncing ball for implementing features of the robot of FIGS. 1-5, without deformation of a top/upper portion of a spherical body.

FIG. 8 illustrates another embodiment of a robotic bouncing ball 800 of the present description that differs from the above embodiments at least because the top or upper portion of the elastomeric ball is not deformed. The robotic bouncing ball 800 includes a spherical body 810 formed of an outer wall (of a flexible material) with an outer surface 812 and an inner surface 814 defining an interior space/void filled with a volume of gas useful for providing a predefined outer diameter (or a diameter in a desired range of ODs).

The robotic bouncing ball 800 includes a mounting element 820 in the form of a rigid mounting plate or disk with an outer edge 821 attached (e.g., glued or the like) about its periphery to the inner surface 814 of the outer wall of the spherical body 810. The mounting element (or plate/disk) 820 has an upper surface 822 facing a "top" or upper portion of the spherical body 810 and an opposite lower surface 824 facing a "bottom" or lower portion of the spherical body 810. The mounting disk 820 allows lift of entire spherical body 810 with minimum force loss due to the elasticity of the outer wall of the spherical body 810.

The robotic bouncing ball 800 includes a controller 850 mounted to the upper surface 824 of the mounting element 820, which may be configured as discussed above with reference to FIGS. 1-5. The robotic bouncing ball 800 further includes a battery 840 provided on the upper surface 824 of the mounting element 820 for providing power to the controller 850 and internal drive components.

The robotic bouncing ball 800 further includes a driver 830 in the form of a linear actuator 832 affixed to and extending from the lower surface 824 at the center of the mounting element/disk 820. The linear actuator 832 has an output (e.g., a drive rod) that is selectively moved back and forth on a linear path (that coincides with a central axis of the spherical body 810 to achieve vertical or up and down bouncing of spherical body 810) as shown with arrows 833. A spring 834 is included in the driver and is shown to be affixed to an end of the output/drive rod of the linear actuator 832. The spring 834 is useful for allowing continuous force to be applied on a bottom portion of the spherical body 810 proximate to an outer end of the spring 834 on downward push 833 by linear actuator 832. The spring's outer end may be spaced apart from the inner surface 814 of the spherical body 810 or abut or be attached to the surface 814 at the bottom/lower portion of the outer wall of the spherical body 810.

Figure 9:
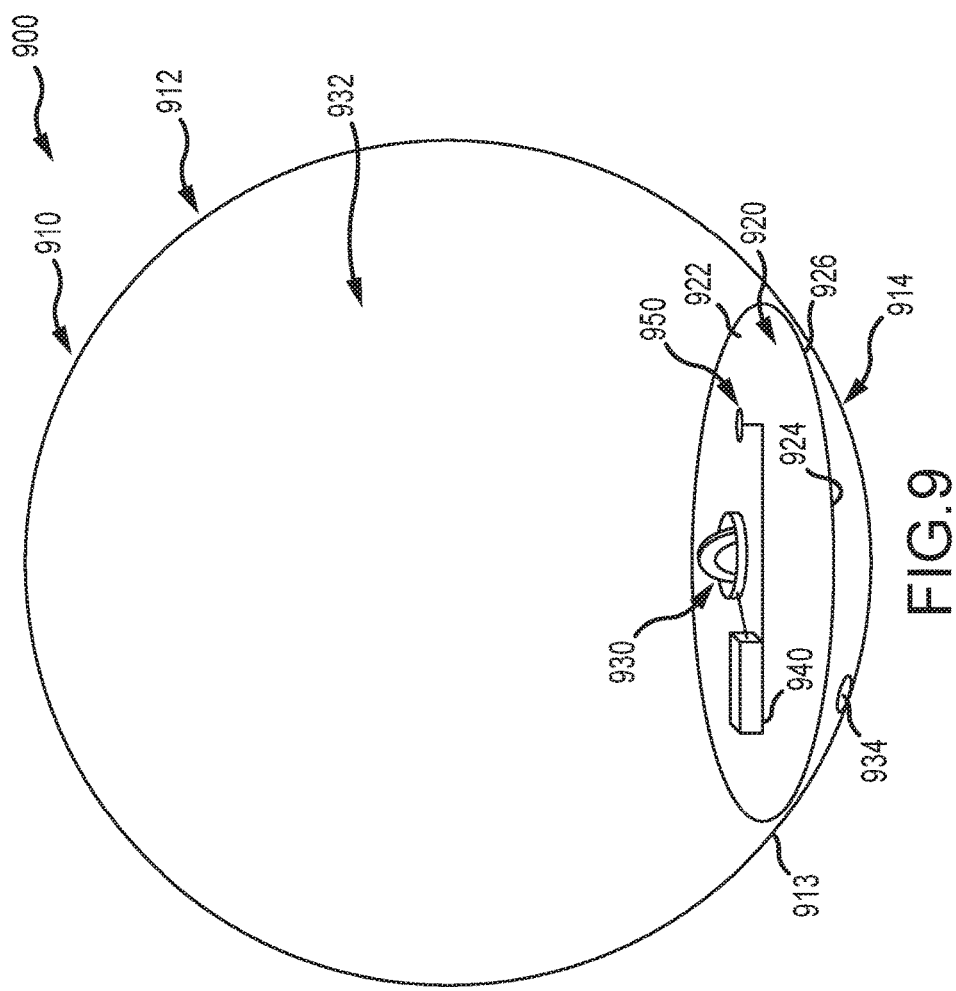
FIG. 9 illustrates another embodiment of a robotic bouncing ball of the present description utilizing stored, higher pressure gas to achieve bouncing of a spherical body.

FIG. 9 illustrates another embodiment of a robotic bouncing ball 900 that is configured to achieve vertical bouncing using stored, high pressure gas (such as air) rather than use of applied forces with mechanical drive mechanisms. As shown, the robotic bouncing ball 900 has a spherical body 910 that is formed of an upper portion 912 and a lower portion 914. The upper portion 912 has a rigid outer wall formed into a semi-spherical shape (e.g., two thirds or more of a sphere of a predefined outer diameter). An elastomeric cover or skin can be applied to the outer surface of the upper portion 912 to provide a soft-sided feel.

A mounting plate or element 920 is provided in the robotic bouncing ball 900 and is mated in an airtight or sealed manner along its outer edge 926 to the circular hole/opening 913 in the semi-spherical upper portion 912. The mounting plate/element 920 together with the upper portion 912 of the spherical body 910 provide a storage tank that is filled, prior to use of the robotic bouncing ball 900, with a volume of gas 932 (such as air) at a higher pressure. The high pressure or compressed gas 932 in effect is stored energy that can later be released or used to cause the spherical body 910 to bounce.

The spherical body 910 further includes a lower portion 914 that is semi-spherical in shape with the edge of its outer wall sealed to the lower surface 924 of the mounting element 920 and/or to the edge 926 of this plate 920. The size and shape of the lower portion 914 may be chosen to complete a sphere of a particular diameter with the upper portion 912. In contrast to the upper portion 912, though, the lower portion 914 is formed with an outer wall suited for bouncing and to contain gases at lower pressures, and the lower portion 914 may be formed with an outer wall formed of a softer elastomeric material such as a rubber, a plastic, a vinyl, or the like. The interior space in the lower portion 914 (defined by the lower surface 924 of the disk/mounting element 920 and inner surface of the outer wall of the semi-spherically-shaped lower portion 914) typically is much smaller in volume than the volume of the interior space of the upper portion 912 (such as ⅓ or less of the overall interior volume of the spherical body 910).

The robotic spherical ball 900 further includes a driver 930 on the disk or mounting element 920 along with a controller 950 on the upper surface 922 of the disk/mounting element 920 and a power source 940 for the controller 950 and/or driver 930. The driver 930 may take the form of a rapid-acting valve (e.g., a butterfly valve or the like), and the controller 950 operates to selectively operate or trigger the valve/driver 930 to release a quantity or volume of the compressed gas 932 from the upper portion 912 into the interior space of the lower portion 914. For example, the valve/driver 930 may be opened impulsively on bottoming-out of a bounce of the spherical body 910.

The controller 950 may include a bounce sensor so that it can act to open the inter-chamber valve 930 to inject high-pressure gas 932 into the elastomeric bottom chamber of the spherical body 910 to give impulsive assist at the bottom of every bounce of the spherical body 910. A release valve 934 may be provided in the outer wall of the lower elastomeric portion 914 to release a quantity of the injected gas 932 to atmosphere to return the bottom or lower portion 914 to a lower pressure (than the upper portion 912) after each bounce. In other cases, though, the gas may be piped back through the rigid upper portion 912 to atmosphere. After a period of bouncing operations, the robotic bouncing ball 900 gradually will deplete the high pressure gas 932 as its potential energy fuel, which would be refilled/recharged to allow further bouncing to occur.

Figure 10:
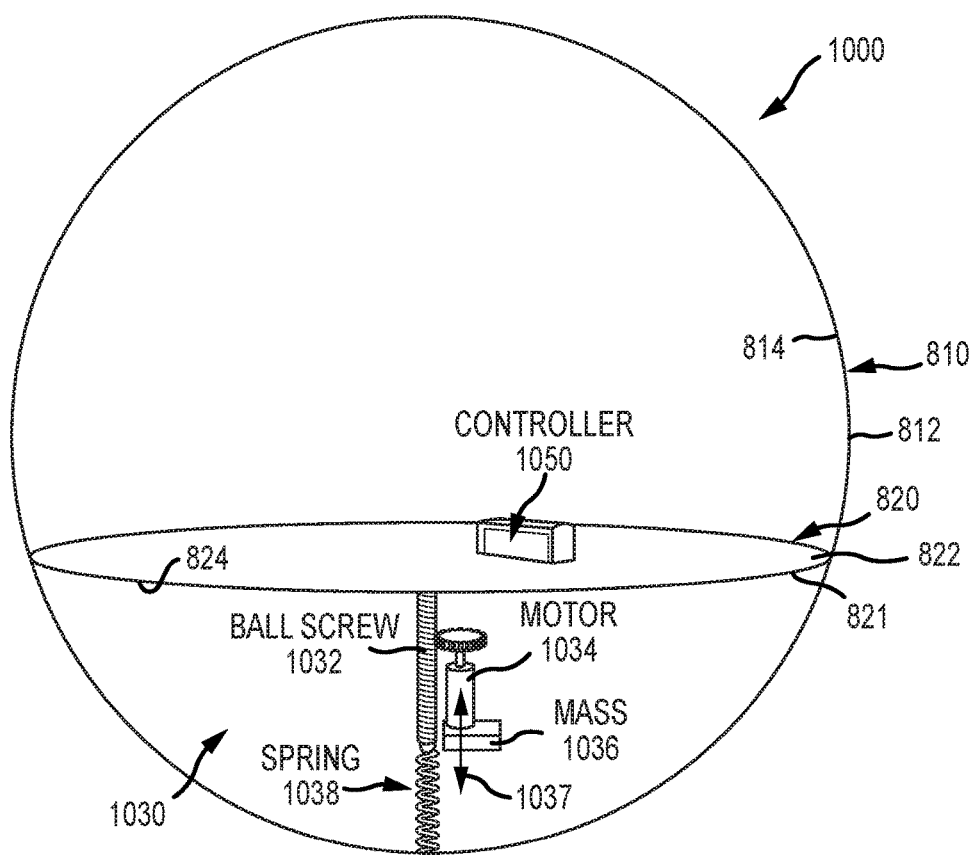
FIG. 10 illustrates another embodiment of a robotic bouncing ball similar to the ball of FIG. 8 for implementing the features of the robot of FIGS. 1-5.

FIG. 10 illustrates another embodiment of a robotic bouncing ball 1000 similar to the ball of FIG. 8, which may be implemented with deformation of one portion of the ball (or without deformation being required in some cases). The ball 1000 may be thought of as implementing a moving mass robotic bouncing ball embodiment in which a mass is moved up and down to generate force on a spring that connects the inner components to the outer components of the ball 1000. As with the ball 800 of FIG. 8, the robotic bouncing ball 1000 includes a spherical body 810 formed of an outer wall (of a flexible material) with an outer surface 812 and an inner surface 814 defining an interior space/void filled with a volume of gas useful for providing a predefined outer diameter (or a diameter in a desired range of ODs).

The robotic bouncing ball 1000 includes a mounting element 820 in the form of a rigid mounting plate or disk with an outer edge 821 attached (e.g., glued or the like) about its periphery to the inner surface 814 of the outer wall of the spherical body 810. The mounting element (or plate/disk) 820 has an upper surface 822 facing a "top" or upper portion of the spherical body 810 and an opposite lower surface 824 facing a "bottom" or lower portion of the spherical body 810. The mounting disk 820 allows lift of the entire spherical body 810 with minimum force loss due to the elasticity of the outer wall of the spherical body 810.

The robotic bouncing ball 1000 includes a controller 1050 mounted to the upper surface 824 of the mounting element 820, which may be configured as discussed above with reference to FIGS. 1-5. The robotic bouncing ball 1000 further may include a battery (not shown) provided on the upper surface 824 of the mounting element 820 for providing power to the controller 850 and internal drive components.

The robotic bouncing ball 1000 further includes a driver 1030 in the form of combination of a ball screw 1032, an electric motor 1034, and a weight/mass 1036 hanging from the motor 1034 and offset from the ball screw 1032. These components of the driver 1030 are affixed to and extend from the lower surface 824 at the center of the mounting element/disk 820. The motor 1034 has an output (e.g., geared connection to screw 1032) that is selectively moved back and forth on a linear path (that coincides with a central axis of the spherical body 810) to achieve vertical or up and down bouncing of spherical body 810 via selective movement of the mass 1036 as shown with arrows 833. A spring 1038 is included in the driver 1030 and is shown to be affixed to an end of the output/drive rod of the ball screw 1032. The spring 1038 is useful for allowing restorative force to be applied on a bottom portion of the spherical body 810 proximate to an outer end of the spring 834 when the body 810 is deformed in bounces. The spring's outer end may be spaced apart from the inner surface 814 of the spherical body 810 or abut or be attached to the surface 814 at the bottom/lower portion of the outer wall of the spherical body 810.

FIG. 10 may be thought of as an embodiment that implements a driver in the form of a rod (e.g., ball screw 1032) and spring (e.g., spring 1038) in series connecting the inner components to the outer wall of the robotic bouncing ball. In such drivers (such as driver 1030 of FIG. 10), a linear actuator (e.g., motor 1034) is attached to this rod, and it moves a mass (e.g., mass/weight 1036) back and forth (as shown with arrow 1037) to generate force on the spring (spring 1038) and outer wall (surface 814 of wall 810).

Figure 11:
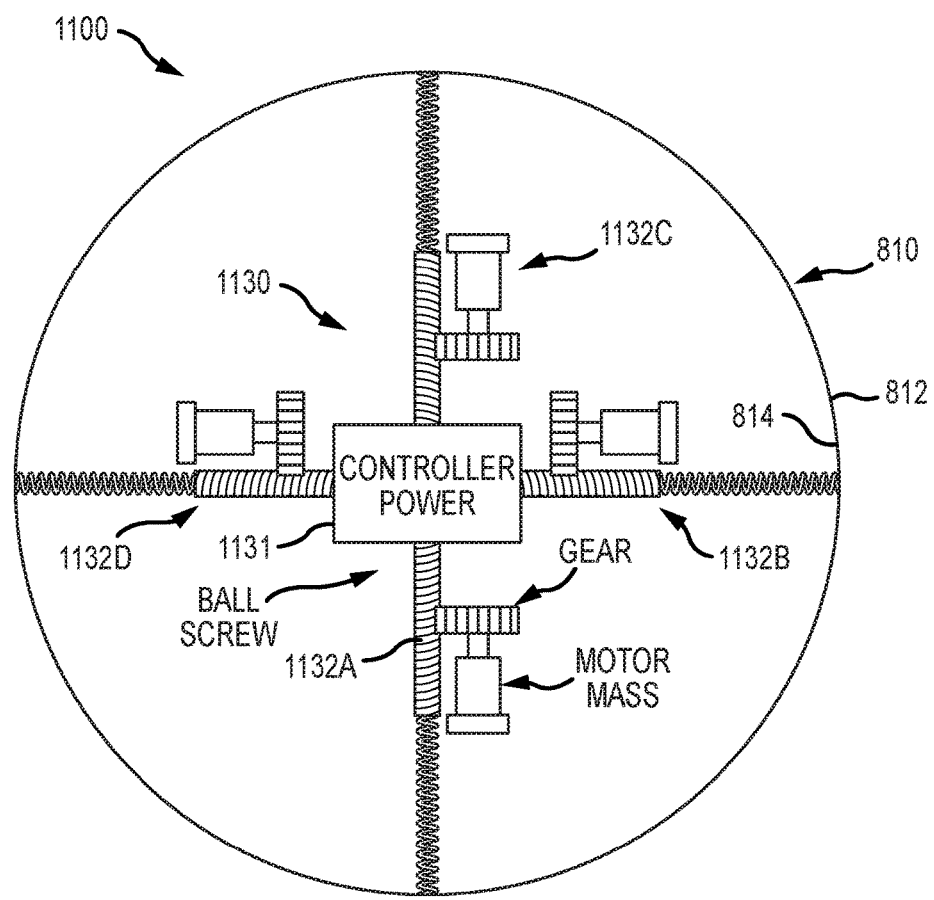
FIG. 11 illustrates an embodiment that builds upon the design of FIG. 10 to provide a spoked configuration of a robotic bouncing ball.

As shown in FIG. 11, a robotic ball 1100 may be provided by repeating this design to create a spoke like structure with a series of rod, spring, and linear actuators moving masses in all (or a desired subset) of the principle directions of motion. The ball 1100 is an implementation of the spoke design for actuating and stabilizing the ball 1100 where multiple actuators are used to both achieve force on the spring/rod in the vertical direction and stabilize the ball 1100 in the horizontal directions. Additionally, via controlled operations, the ball 1100 can rotate in flight to bounce on (or near) different spokes (sub/spoke drivers) and create dynamic motions akin to running.

As shown, the driver 1130 includes a controller/power source 1131 for controlling/powering four sub/spoke drivers 1132A-1132D arranged as four spokes (or two or more may be added to provide six or more spokes in some cases), which are offset from each other by 90 degrees and extend out from the centrally positioned controller 1131. Each sub/spoke driver 1132A-1132D may take the form of the driver 1032 shown in FIG. 10. Such a design may be desirable as it allows for control of the jump height of the ball 1100 in the vertical (Z) direction, as well as stabilization in the X and Y directions through movement of the masses orthogonal to the vertical rods.

Additionally, ideas from dynamic locomotion can be used to transition between the spokes in the air creating a forward bouncing motion mimicking different legs coming in contact with the ground when running. Also, note, the driver 1130 may instead be implemented with electric rotational or linear motors to achieve a same result in each (or select ones) of the sub/spoke drivers 1132A-1132D. Further, in addition to the multi-spoke design of FIG. 11, one skilled in the art will readily understand there are multi-actuator variants for all of the designs listed and described herein. For example, multiple actuators may be arranged in a "pyramid" structure to implement an embodiment of a robotic bouncing ball of the present description.

Figure 12:
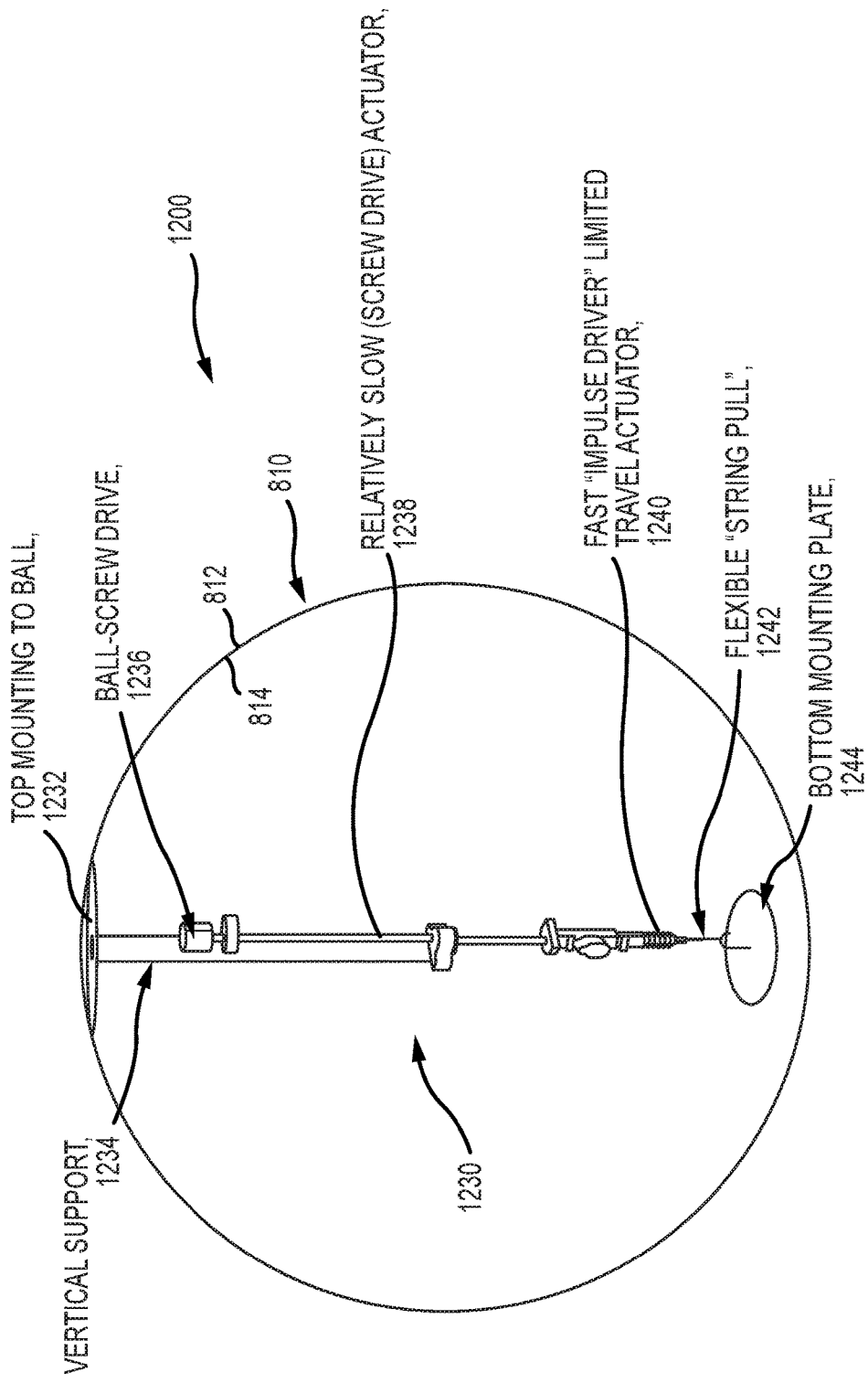
FIG. 12 illustrates an embodiment of a robotic bouncing ball similar to the ball of FIG. 8 for implementing the features of the robotic bouncing ball system of FIGS. 1-5 with a retracting drive.

FIG. 12 illustrates an embodiment of a robotic bouncing ball 1200 similar to the ball 800 of FIG. 8 for implementing the features of the robotic bouncing ball system 100 of FIGS. 1-5. FIG. 12 differs from the ball 800 of FIG. 8 in that it utilizes a retracting drive 1230. As shown, the retracting drive 1230 includes a top mounting element 1232 and a bottom mounting element 1244, which may be plastic, elastomer, metal, or other material plates or the like that act to affix the drive 1230 to the inner surface 814 of the elastomeric ball/hollow body 810. The retracting drive 1230 further includes a vertical support 1234 extending from a first end attached to the top mounting element 1232 to a second end, which may be located at or near the center of the spherical body 810.

A drive motor (and controller) 1236 (such as a ball screw-type motor) is mounted onto the vertical support 1234 some distance from the center of the body 810 (or second end of support 1234). The drive 1230 further includes a slow actuator 1238 coupled to the output of the drive motor 1236 at a first end and at a midpoint to the second end of the vertical support 1234, and the slow actuator 1238 may be a relatively slow actuator such as a screw drive that is used to raise and lower a faster impulse driver (or limited travel actuator) 1240, with the amount of travel depending on a current bounce height. The fast impulse driver 1240 provides rapid extra squeeze or pull up from the bottom via a flexible connector (e.g., a flexible string pull or the like) 1242 and bottom mounting element 1244 and from the top via the rigid vertical support 1234 and top mounting element 1232. This extra squeeze/pull is provided upon maximum vertical compression of the ball/body 810 caused by landing on the ground or other surface. The flexible pull string 1242 allows the ball 810 to be free to return to spherical shape when moving upward and allows a powerful pull to be provided when the ball/body 810 is at the bottom of compression.

The retracting drive 1230 is configured, in part, based on the inventors' understanding that to achieve a continuously bouncing ball, at a minimum, it is desirable to replenish the energy lost during each bounce (e.g., due to friction, aerodynamic losses, and losses due to energy going into modes that do not aid vertical bounce). The robotic bouncing ball 1200 can advantageously supply this energy during the time when the ball is at the bottom of a bounce and is in its "compression" stroke by squeezing the ball/body 810 just a bit more than it would have been compressed by the fall. The bottom of the compression stroke can be identified using an accelerometer of various kinds to detect a peak in deceleration (not shown in FIG. 12 but may be part of a controller for motor 1236 and/or for fast actuator 1240).

In some preferred embodiments, a fast and strong (per weight) actuator 1240 is provided in driver 1230 with a stroke that is as long as the difference between the uncompressed ball diameter and its diameter when at the bottom of its stroke, on the ground when it has fallen from its greatest bouncing height (when the body/ball 810 will be most vertically compressed). In some cases, though, off-the-shelf actuators with high impulse speed and strength over a long stroke are not easily obtainable. Solenoids and small rack-and-pinion actuators generally have adequate strength and speed but have relatively short stroke length. Ball-screw type drives have more than adequate strength and long travel but are generally slow (compared to the impulse needed to rapidly further compress the ball/body 810 while it is in the midst of its maximum natural compression).

Hence, the robotic bouncing ball 1200 can utilize driver 1230 that takes advantage of the dynamics of bouncing by using a relatively slow extending element 1238 capable of a long stroke to extend the reach of a powerful, shorter stroke, but higher impulse speed, actuator 1240 as shown in FIG. 12. Here, as an example, a ball-screw drive 1238 can raise or lower a powerful, short-stroke, but high impulse speed, rack and pinion actuator 1240 after each bounce. For example, the ball screw actuator 1238 may start in its most extended state. At this point, the faster impulse driver 1240 pulls hard on the ball/body 810 collapsing it. As the ball/body 810 rises from its compression, the fast actuator 1240 releases its pull (via string pull 1242 and bottom mounting element 1244) and is slightly raised towards the top of the ball (and top mounting element 1232) by the slower, ball-screw actuator 1238. During a second bounce, the fast actuator 1240 is now positioned to be able to squeeze the ball/body 810 beyond the first amount of compression. As the ball/body 810 bounces higher, the screw drive 1238 gradually raises the fast actuator 1240 so that it is always able to pull at the appropriate level to increase or decrease the amount of energy that it can apply to the ball/body 810. Although a ball screw drive and a faster rack and pinion drive are shown here for implementing drive components 1238 and 1240, many combinations of slow staging of a fast actuator are herein incorporated.

Figure 13:
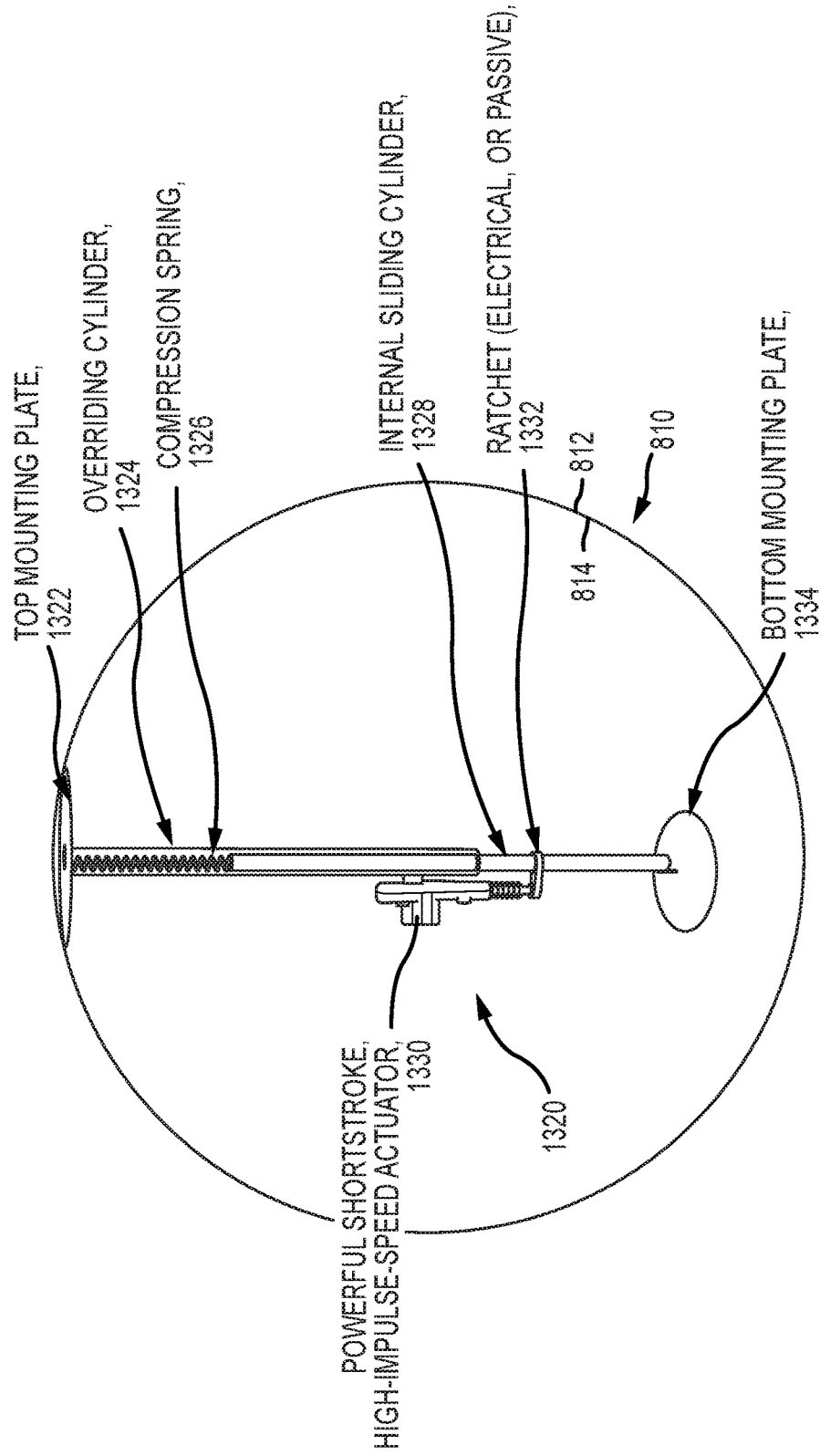
FIG. 13 illustrates another embodiment of a robotic bouncing ball similar to the ball of FIG. 8 for implementing the features of the robotic bouncing ball system of FIGS. 1-5 with a ratcheting drive.

FIG. 13 illustrates another embodiment of a robotic bouncing ball 1300 similar to the ball 800 of FIG. 8 for implementing the features of the robotic bouncing ball system 100 of FIGS. 1-5 with a ratcheting drive 1320. The driver 1320 includes a top mounting element 1322 coupling the drive 1320 at a first end to the inner surface 814 of the elastomeric ball/spherical body 810 and further including a bottom mounting element 1334 coupling the drive 1320 at a second end to the inner surface 814 of the ball/body 810. The mounting elements 1322, 1334 may be circular-shaped plates or take other forms to attach the drive components to the ball/body 810.

The ratcheting drive 1320 includes an overriding cylinder 1324 that is coupled at a first end to the top mounting element 1322 and has a free, open second end at or near the center of the spherical body 810. The cylinder 1324 receives a rod (or internal sliding cylinder) 1328 along with a compression spring 1326. The rod 1328 is attached at a first end to the bottom mounting element 1334 and has its free second end located within the cylinder 1324 such that its movements are guided by the inner walls of the cylinder 1324. The spring 1324 is mated at a first end with the top mounting plate 1322 and at a second end with the second end of the rod 1328 such that it is compressed by inward movement of the rod 1328 and assists expelling the rod 1328 outward from the cylinder 1324. The drive 1320 further includes a high speed actuator 1330 that is mounted to an outer wall of the cylinder 1324 and to the rod 1328 via a ratchet coupling 1332. A controller typically is also included (as discussed above) to control operations of the actuator 1330, which may be chosen to provide a powerful, short stroke at relatively high speed.

In the case of the ratcheting drive 1320, the design of the robotic bouncing ball 1300 again takes advantage of the fact that for sustained bouncing, it is desirable to supply energy to the ball/body 810, which replenishes losses incurred during the previous bounce. A relatively small amount of increased compression of the ball 810 at the bottom of its "compression stroke" is provided by the drive 1320 during operations of the robotic bouncing ball 1300. In this embodiment, a high power and high speed, short stroke actuator 1330 is affixed by a support (overriding cylinder 1324) to the top of the ball/body 810 via mounting element 1322.

The actuator 1330 can momentarily "latch onto" a support (internal sliding cylinder/rod 1328) connected to the bottom of the ball/body 810 via mounting element 1334, during the bottom of a compression stroke, but simply slide over the cylinder/rod 1328 during other times. As shown in FIG. 13, an electrically-driven clamp (or a passive ratchet) 1332 allows the actuator 1330 to firmly pull the top and bottom of the ball/body 810 closer together at the bottom of a bounce, while allowing the ball/body 810 to spring back unfettered during the rest of the bounce. A low-force compression spring 1326 keeps the top and bottom cylinders 1324 and 1328 loosely up against the top and bottom of the ball/body 810 as it flexes. The ratchet 1332 and drive signal (from a controller not shown but understood from other figures provided herein) to the high speed actuator 1330 are triggered by accelerometer inputs in some implementations.

The robotic bouncing ball designs taught herein may be created to satisfy one or more of a set of safety goals to allow the balls to be used among, near, or by people. These goals may include a design with no sharp edges. With regard to this safety goal, larger radius objects/balls are inherently safer because their use is unlikely to cause cuts, to have any eye, mouth, or nose issues, and distribute contact force over a large area. Another safety goal may be to provide inward compliance. Compliance in the inward direction reduces peak force from momentum based impact by spreading it over time. This also results in less shock acceleration. Tensile elements (fibers, strings, thin beams) are good here as they instantly buckle with unexpected load. Rigid rods are less good as they could result in an unwanted sharp contact with large enough inward displacement. Outward compliance is not typically as important for the robotic bouncing ball design. Another exemplary safety goal may be to provide a design with relatively low momentum. Even if the shape is safe and the compliance is large, momentum should be controlled or considered in the design, and this may mean that mass would ideally be kept to an absolute minimum or at least lowered for each design. Reaction masses may, therefore, be less attractive if there is an alternative in some designs. The desire to limit or control momentum magnitudes may also mean that ball dynamics are non-negligible (e.g., want the weight of the ball to be appreciable compared to the mechanisms and batteries). Hence, some designs were developed to avoid a design that is merely a ball-shaped wrapper around a heavy robot (except for balls where no contact with human is likely).

These three safety goals point to a tensile-connected, small-core mechanism or drive that pulls on strings on the top and bottom using the ball itself instead of an extra mass for energy storage as a good candidate where possible. FIGS. 14A and 14B schematically illustrate a robotic bouncing ball 1400 formed of an elastomeric body (or skin or shell) 1410A and 1410B shown in first and second states during operations of the robotic bouncing ball 1400. The ball's skin or body 1410A and 1410B has an outer surface 1412 that contacts the surrounding environment during use and an inner surface 1414 that defines an inner void space that, in this example, is filled with a pressurized gas 1416. The robotic bouncing ball further includes a pair of tendons (or pull elements, strings, or the like) 1432 and 1434 that are attached at outer ends to the inner surface 1414, such as at opposite sides of the ball/body 1410A, 1410B with the tendons 1432, 1434 arranged to be co-linear (or nearly so). The inner ends of the tendons 1432, 1434 are attached to a motion core/energy storage element (e.g., a drive motor) 1436 that as shown with arrows 1433, 435 in FIG. 14B acts to pull upon the tendons 1432, 1434 during the second operating state of the ball/skin 1410B.

When considering implementation of the robotic bouncing ball 1400, the inventors recognized that the ball's skin/body/shell 1410A may simply locally deform as shown in second state 1410B, forming a small divot on both sides as this is the shape that took the least energy to form. This may reduce the energy that is added to the ball by deformation and may cause a suboptimal shape to be formed as shown in FIG. 14B that is so different from the bounce shape and looks strange as well. A number of methods to mitigate this effect can be implemented in the robotic bouncing ball 1400 and include local thickening of the film in the areas with attached tendons. An elastomer-based contour can be made whose shape provides the desired ball deformations by locally preventing bending in the ball surface. This can have the included downside of increasing stiffness (at least locally) as well as weight. Weight on the bottom of the ball is particularly problematic as it is unsprung and has no chance to smoothly accelerate on takeoff resulting in an energy losing "collision" with the rest of the ball.

In the same or other balls 1400, a series of small rigid rods attached to the ball forming sort of an internal, multi-stage, 2D whippletree mechanism could be included and used to distribute force in a known manner over a variable and changing surface contour within some limits. Ratios of forces are fixed by the geometries of each link over a multitude of mount points. The same can also be done with tendons and pulleys. In other cases, though, a 2D flexure could similarly distribute force over a large area in a controlled way and with locally determined stiffness and lighter weight than the elastomer of the ball. A very complex network of individual variable compliance material tendrils could also be used to get the desired result. This could be 3D printed or be casted from a 3D printed negative. A simple thin plate serving as a cap could also help in a final implementation of the ball 1400.

Figure 15C:
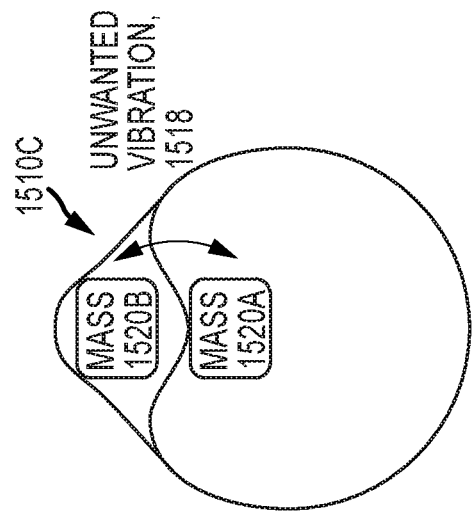
FIGS. 15A-15C are schematic illustrations of a body/skin of a robotic bouncing ball in a rest/first state, in a compression/second state, and in a bounce/third state, respectfully.
Figure 15B:
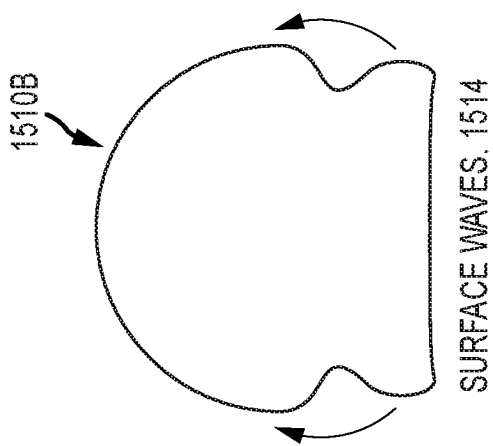
Figure 15A:
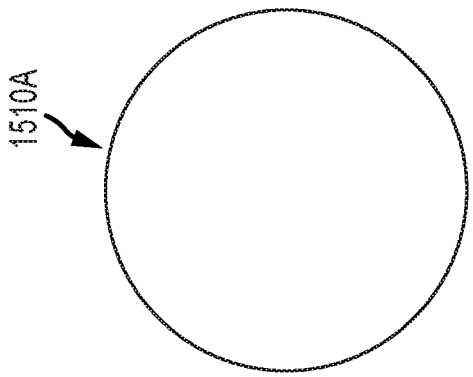

FIGS. 15A-15C are schematic illustrations of a body/skin 1510A-1510C of a robotic bouncing ball in a rest/first state, in a compression/second state, and in a bounce/third state, respectfully. Since, in many implementations, it is desirable to provide as lightweight a robot/bouncing ball as is possible, the ball's skin 1510A-1510C may have an appreciable mass compared to the overall system. Having the skin 1510A-1510C move in undesired ways upon bouncing can, therefore, represent an appreciable energy loss. A simple pressurized elastomeric ball 1510A is shown in a rest state and then at 1510B upon bouncing to show it will have translational surface waves 1514 due to the fast deformation. If the waves 1510 are unsynchronized with the motion of the bounce (as they very likely will be), the energy of this motion is a loss.

Inextensible, yet still flexible, circumferential bands (e.g., Kevlar braid bands at strategic locations around the ball) could be included in/on the skin/body 1510A-1510C as such bands may be desirable to reduce the energy of this deformation or even tune its behavior if necessary. A full inextensible (but flexible due to being thin) skin 1510A-1510C may also be helpful. A full nylon fabric covering for example will make the ball much less able to expand but will not affect its inward compliance for small displacements, and it has been shown to increase the efficiency of bouncing during prototyping by the inventors. A fabric outer shell 1510A-1510C also has the advantage of taking the load from the elastomeric material allowing the ball to be inflated safely to much higher pressures than would be possible with a typical elastomeric skin alone (also reducing the weight overall since its tear resistance and strength per weight is better than typical rubbery materials).

Despite the desire to keep the weight to a minimum, the ball will have some added mass due to robotic elements. Unfortunately, mass attached to the top of the ball's skin/body 1510A-1510C as shown in two positions at 1520A and 1520B has a different effective spring constant and mass from the ball as a whole and so tends to go into an unsynchronized oscillation 1518 upon impact as shown in FIG. 15C. The alternative (not shown) presents a problem as mass that is attached to the bottom of the ball will tend to cause energy losses as the upward moving ball virtually collides with the stationary mass. A light-weight spring mounted from the bottom of the ball to the robot mass can be tuned to mitigate this (as discussed above and shown below in the figures) by designing it with an appropriate linear or non-linear force displacement curve to best achieve matching of the displacements as a function of time when bouncing in the desired conditions. Active actuation could also mitigate this as well, especially if the main propulsion actuators are capable of both pushing and pulling. Changing the mount position (mounting to a disk in the center of the ball) or distributing the force over a larger effective area to increase stiffness is also possible to tune the behavior as well.

Figure 16A:
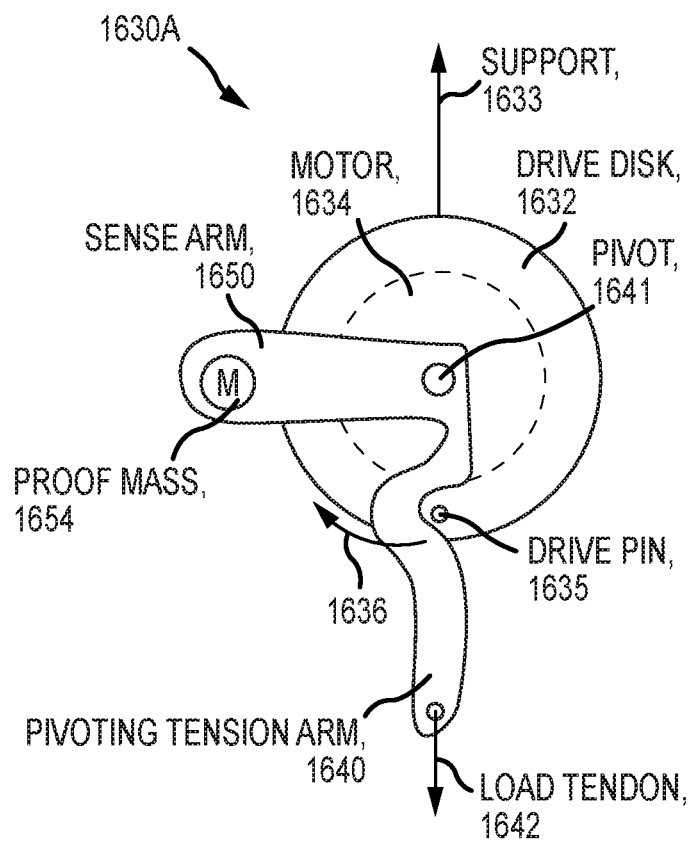
FIGS. 16A-16C illustrate an exemplary embodiment of a drive that may be used in a robotic bouncing ball (such as that shown in FIGS. 14A and 14B) in an at rest state, in a first operating state, and in a second operating state, respectfully.
Figure 16B:
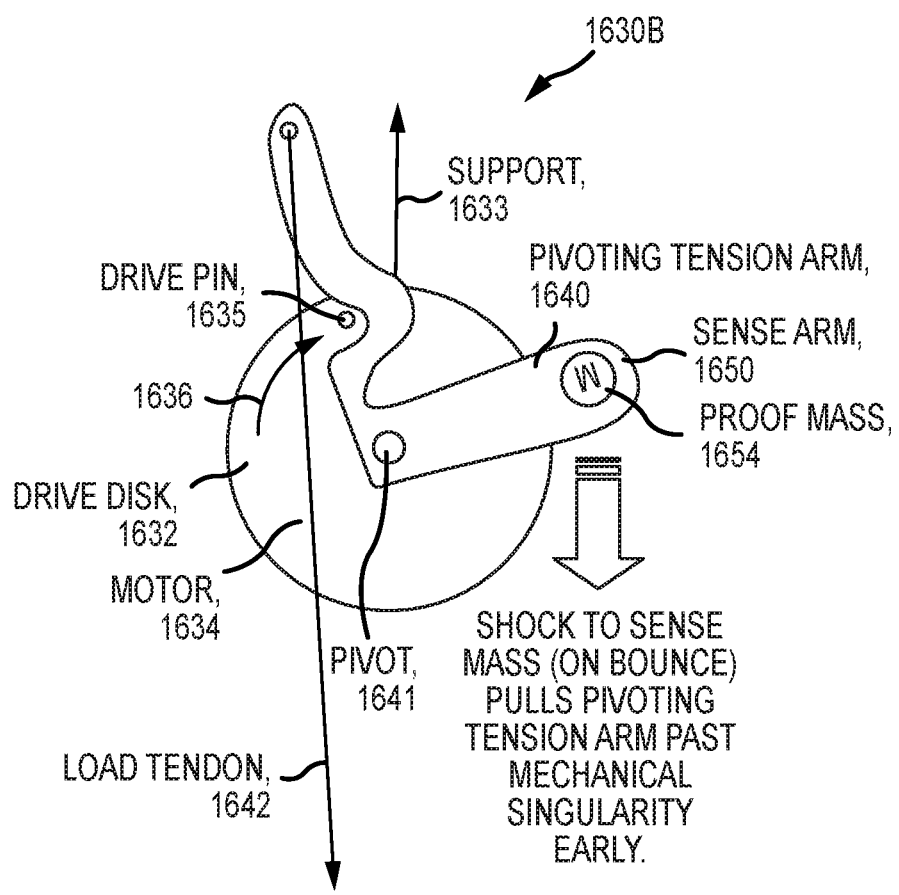
Figure 16C:
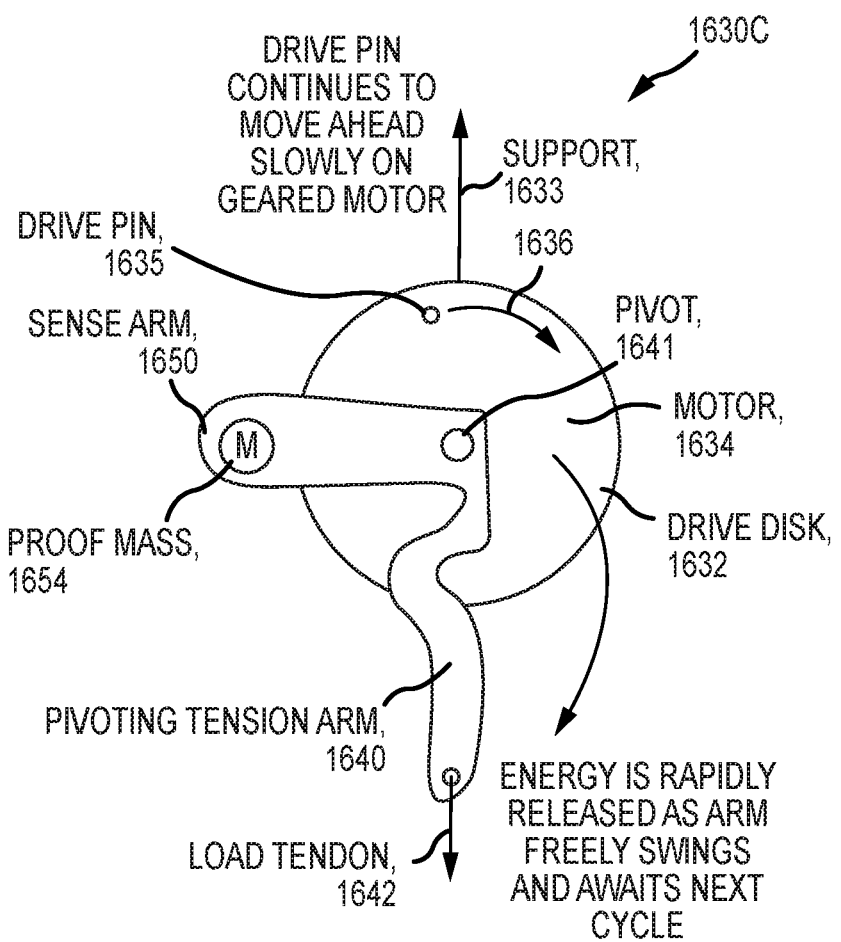

FIGS. 16A-16C illustrate an exemplary embodiment of a drive 1630A-1630C that may be used in a robotic bouncing ball (such as that shown in FIGS. 14A and 14B) in an at rest state, in a first operating state, and in a second operating state, respectfully. As shown in FIG. 16, the drive 1630A is in an at-rest state, and the drive 1630A includes a drive disk 1632 that may hang within an interior space/volume of a ball/spherical body (e.g., with the center of the disk or pivot pin 1641 coinciding with the body's center). The drive 1630A includes a motor 1634 that is supported by support 1633 (which is attached at an opposite end to an inner surface of a skin/body of the robotic bouncing ball), and the motor 1634, in turn, supports the drive disk 1632.

The drive 1630A further includes pivoting tension arm 1640 that is driven (as shown with arrow 1636) by the drive disk 1632, which is rotated about its center, via drive pin 1635 (to rotate about pivot 1641). The drive 1630 includes a load tendon 1642 extending from a first end that is attached to the end of the tension arm 1640 to a second end that would be attached to an inner surface of the ball's body/skin (such as a point opposite the attachment point for support 1633). Further, the drive 1630 includes a sense arm 1650 that is coupled to the tension arm 1640 at the pivot 1641, and a proof mass 1654 is mounted at the cantilevered end of the sense arm 1650. As shown in first operating state of drive 1630B of FIG. 16B, a shock to the sense mass 1654 (on a bounce) pulls pivoting tension arm 1640 past mechanical singularity early. As shown in the later/second operating state of drive 1630C of FIG. 16C, the drive pin 1635 continues to move ahead slowly on geared motor 1634. Energy is rapidly released as the arm 1640 freely swings and awaits a next cycle.

The drive 1630A-1630C is desirable in some implementations of a robotic bouncing ball as it is attractive to make a low cost, bouncing ball such as for toy applications. A continuous bouncing generator/drive 1630A-1630C that is self-synchronized to bounce cycles can be achieved with the following motion core that is suspended in the middle of the ball as shown in FIGS. 16A-16C. The proof mass 1654 is used as a mechanical acceleration sensor that triggers the rapid release of energy on a bounce cycle. The sensitivity to shock increases as the mechanism 1630A-1630C slowly approaches its singularity. Big or small bounces can be sensed and built upon. In the event no bounce sensed, it will automatically release energy at a fixed time interval as a default to start bouncing. Variants on such a mechanism include two similar mechanisms face-to-face to cancel induced torques in the support tendons or side-by-side with geared synchronization driving a mirrored motion so that the support can be centered and the arms symmetrical, again to reduce torque problems. While one arm is shown for simplicity, the same motor could be operating several to balance motor load and decrease the time between cycles.

In some implementations of a robotic bouncing ball, it may be desirable to include a skeleton to interface between the soft ball shell and the likely-stiffer elements that make it move. A pneumatic skeleton can serve that purpose. FIG. 17 shows a body/elastomeric skin 1710 with an outer surface 1712 and an inner surface 1714 defining an inner space that can be filled with pressurized gas 1718 at a first pressure, P1. The skin/body 1710 is shown to include a relatively simple version of an internal pneumatic skeleton 1720 in the form of an inflatable doughnut-shaped inner tube 1722 that is inflated with a pressurized gas 1724 to a second pressure, P2, that is greater than pressure, P1, of gas 1718 in the body/skin 1710 of the ball itself as shown in FIG. 17. This increases the side-to-side rigidity of the robotic bouncing ball mechanisms by distributing force into a large area of shell smoothly and without visual defect, and such a skeleton/support frame structure may be included in any of the robotic bouncing balls shown herein.

More complex variants are also possible as shown in FIG. 18 with a spherical body/shell/skin 1810 with an outer surface 1812 and an inner surface 1814 defining an inner void space that can be filled with gas 1818 at a first pressure, P1. A support structure or skeleton 1820 is positioned within the interior space defined by inner surface, which is spherical in shape when the gas 1818 is used to fill or pump up the ball to the fill pressure, P1. The skeleton 1820 includes a first tube 1822 shaped in a circle or donut and filled to a second pressure, P2, that is greater than the ball's fill pressure, P1. Further, though, at least one more or a second tube 1826 that is also circular or donut shaped is placed inside the interior space of the shell/body 1820 and is fill with gas 1828 that is pressurized to a third pressure, P3, that is greater than both the first and second pressures, P1 and P2. The tubes 1822 and 1826 are shown to intersect and/or pass through each other in FIG. 18, but other arrangements may be used that employ two or more inner tubes within the shell/body 1810.

The pneumatic skeleton works well at being light and compliant, but other flexible elements can work as well (rubber hoop, flexure, and the like). More specifically, for the sake of controllability, it may be desirable to have a system that for the expected load is stiff but, once the load is larger than the expected loads, one can assume that something has gone wrong. An inflated column has the benefit of being rigid for smaller forces but then buckling and reducing rigidity to near zero past a critical force. This is especially true when it is experiencing side load. Such a system gives good controllability and suspension as well as a safety mode when outside of those conditions. A pressure overload blow-off valve could also be included for additional safety. Magnetic breakaway elements can behave similarly, as can thin buckling beams, or active suspensions.

Some drives may utilize multiple linear actuators that tilt by phase. By having three actuators, which are arranged in a triangle pattern on the bottom of the ball's body/skin/shell, the robotic bouncing ball can be operated to change launch angles by adjusting phasing of the elements individually. In other embodiments, the drive may include pneumatic pistons for force displacement matching of actuation. Pneumatic pistons allow for independent control of force. Displacement curves could increase the efficiency of the pneumatic bouncer described with the soft bottom and upper air reservoir.

In some drives, velocity is provided to the robotic bouncing wall using a reaction wheel control scheme. Reaction wheels store angular momentum allowing a body to effectively rotate in air for a limited amount of rotation al velocity. By rotating the reaction wheel at max before impact, a ball could start spinning and convert some of that angular momentum into velocity. Concurrently, the reaction wheel has a chance to spin down while partially anchored on the ground. This allows the ball to convert a finite angular momentum into velocity using periodic ground interactions, and this can avoid issues with reaction wheel capacity since the ball does not keep spinning on average. Such a design or unique capability leads to an interesting movement gait where the ball can start with simple bouncing and small translation then starts spinning end over end while landing on its vertical hop axis on every bounce. If the robot works in either vertical orientation, it could perform any multiple of half-flips and still maintain jump control.

In some embodiments, it may be desirable to utilize an external drive with a passive ball or with a robotic bouncing ball as taught herein. FIG. 19 shows a ball-based system 1900 with a passive or active ball 1910 selectively moved with an external drive 1930 in the form of a tile/floor element 1932 moved with X-Y-Z motion by X-motor 1940, Y-motor 1942, and Z-motor 1946 (and optional sensors 1934 for sensing movements of the tile/floor element 1932). FIG. 20 shows a ball system 2000 with an active or passive ball 2010 selectively moved by operations of an external drive with tile/floor element 2032 moved with pitch, roll, and Z motion with pitch motor 2036, roll motor 2038, and Z motor 2034, respectively.

The external drives 1930 and 2030 may be provided in or as part of a floor, a wall, and/or a ceiling that contains actuators and sensors necessary to cause or control a desired trajectory of a passive or active ball causing it to move in interesting and entertaining ways. This could be useful for achieving higher complexity motion than the standalone robotic ball previously presented, or for turning a simple passive ball (say a basketball in a basketball store or exhibit) into an entertaining show or display of for instance, a continuously bouncing ball. In FIG. 19, bounce energy is added by a short pulse of motion in the out-of-plane Z direction 1946, and trajectory control is imparted by the in-plane actuators (X, Y) 1940, 1942 shown as linear motors. Alternately, in FIG. 20, tilting motors (pitch, roll) 2036, 2038 are used to change the angle of the surface. Since contact duration is short (~50 ms), none of the actuators would have to move very long or far to impart useful motion to the ball via the floor/tile element 1932, 2032. This is especially interesting in that if lighting is controlled (magnitude, angle, and possibly pulsed) or if the motion of the platform overall is small compared to the ball, humans may not even notice the motion of the substrate making it appear magical.

The tilting control of system 1900 of FIG. 19 is easily understood, as the vector normal to the substrate (the "Surface Normal") will be the line about which the incoming and outgoing velocities are mirrored minus losses (or gains provided by the Z motor 1946) in bounce energy, plus any interactions that are a result of spin. The simple X-Y slider motion of FIG. 19 is a bit harder to understand or explain. At impact of the ball 1910, the floor/tile element 1932 is driven to achieve a desired X-Y velocity based on a control law that will be constant throughout the bounce assuming the ball 1910 is light compared to the drive mechanism 1930. During the time the ball 1910 is in contact with the substrate 1932, its skin will locally match the velocity of the substrate (within friction limits) 1932. Since the ball's skin has a moment of inertia, the ball 1910 cannot simply spin about this new velocity readily, so the center of mass begins to move at a velocity of about one half the velocity of the tile 1932. Thus, the ball 1910 is "nudged" in the direction of the moving platform 1932.

The above examples described with reference to the figures are only exemplary in nature and are non-limiting embodiments. In some other embodiments, the body of the bouncing ball is not filled with gas or at least is not pressurized (e.g., may be at atmosphere or lower in some cases). In these embodiments, the elasticity of the bouncing ball is provided by the body formed of rubber or other elastic material. While shown in FIG. 1 and other figures as spherical, the body of the bouncing ball does not need to be spherical, and, in these alternative embodiments, the ball's body may be shaped similar to a football, may be shaped like an egg, or may take on another shape. Such non-spherical bouncing balls may be desirable to provide unique and fun (or unexpected) bouncing, such as bouncing that is relatively stable on one side but chaotic on "ends" of the body of the bouncing ball.

It will be understood by those skilled in the arts that the internal mechanism/components can be mounted and/or suspended in many ways. For example, the mounting element(s) could be or include: strings, springs, wires, rubber bands, tentacles, linkages, and/or structural members (with some exemplary structural members shown in FIGS. 1-5 and other figures). In some cases, the internal mechanism/components include electromagnetic members to provide mounting and/or driving forces.

In some embodiments, the body of the bouncing ball is designed so that there is not an obvious top and bottom. In such designs, the bouncing ball or system may be symmetric and may be movable in all directions. If there is a top/bottom, the bouncing could be designed to keep the "top always up." If no designated/designed "top" to the body, the bouncing ball could be operated to spin while bouncing, which in many ways may be easier to control or operate. From an entertainment point of view, the ball could be controlled/operated to bounce left/right (back and forth) by having spin on impact. It should also be noted that the ball's body may not deform the way shown in the figures. For example, the shell/outer wall could be formed of a harder material (such as a plastic shell or the like) with the bouncy or elasticity functionality or capability being contained within the shell/outer wall of the bouncing ball.

Instead of moving masses internally or pulling on the inner wall with some mechanical means (linear actuator, wire, or the like), the bouncing ball may, in some embodiments, also be actuated by having multiple pressure chambers (again, not just top/bottom chambers). A battery (or energy storage device) could, hence, be a compressed gas container. For example, the bouncing ball or ball system may include a pressure supply, a plurality (e.g., 3 to 10 or more) of chambers within the ball body, which can be filled and released, such as in an explosive manner, to achieve desired bouncing and controlled movements of the bouncing ball.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A robot with bounce-based locomotion on a support surface, comprising:
   a body comprising an outer wall enclosing an interior space, wherein the outer wall comprises a first portion formed of an elastic material;
   a driver supported by a mounting element within the interior space of the body; and
   a controller generating control signals to operate the driver to apply a first force upon the first portion of the outer wall of the body,
   wherein the body bounces at least in a vertical direction through a range of heights above the support surface, wherein the outer wall comprises a second portion, opposite the first portion, formed of an elastomeric material,
wherein the first force comprises a deforming force pulling the first portion of the outer wall a distance toward a center of the interior space, and
wherein the controller further operates the driver to repeatedly apply the first force and to repeatedly release the first force during an initial stage of each of the bounces of the body.

2. The robot of claim 1, wherein the body is spherical and wherein the interior space is filled with a volume of gas to inflate the body to an outer diameter in a predefined range.

3. The robot of claim 1, wherein the elastic material comprises rubber.

4. The robot of claim 1, further comprising a battery supported by the mounting element in the interior space and providing power to the driver and the controller.

5. The robot of claim 1, wherein the controller further operates the driver to apply a second force upon the second portion of the outer wall during a later stage of each of the bounces of the body.

6. The robot of claim 5, wherein the controller determines a bottom of each of the bounces and wherein the controller synchronizes the release of the first force and the applying of the second force with the bottom of each of the bounces.

7. The robot of claim 1, wherein the driver comprises a connecting rod attached to the outer wall in the first portion and further comprises a linear actuator moving the connecting rod along a linear path to apply the first force.

8. The robot of claim 7, further comprising a weight supported on the mounting element distal from the first portion and opposite the connecting rod and wherein the body is steered in a horizontal direction relative to the support surface by the controller selectively shifting the weight or rotating an angle of the linear actuator.

9. A robot with bounce-based locomotion on a support surface, comprising:
a body comprising an outer wall enclosing an interior space, wherein the outer wall comprises a first portion formed of an elastic material;
a driver supported by a mounting element within the interior space of the body; and
a controller generating control signals to operate the driver to apply a first force upon the first portion of the outer wall of the body, wherein the body bounces at least in a vertical direction through a range of heights above the support surface, and
wherein the body is spherically shaped with the interior space inflated with a gas, wherein the mounting element comprises a circular disk with an outer edge mated to an inner surface of the outer wall, and wherein the driver comprises a spring moved, during the bounces, toward and away from the circular disk toward the first portion of the outer wall by the driver.

10. The robot of claim 9, wherein the body is spherical and wherein the interior space is filled with a volume of gas to inflate the body to an outer diameter in a predefined range.

11. The robot of claim 9, wherein the elastic material comprises rubber.

12. The robot of claim 9, further comprising a battery supported by the mounting element in the interior space and providing power to the driver and the controller.

13. A robot with bounce-based locomotion on a support surface, comprising:
a body comprising an outer wall enclosing an interior space, wherein the outer wall comprises a first portion formed of an elastic material;
a driver supported by a mounting element within the interior space of the body; and
a controller generating control signals to operate the driver to apply a first force upon the first portion of the outer wall of the body, wherein the body bounces at least in a vertical direction through a range of heights above the support surface, and
wherein the body is spherically shaped, wherein the outer wall further comprises a second portion formed of a rigid material, wherein the mounting element sealably partitions a first portion of the interior space enclosed by the first portion of the outer wall and a second portion of the interior space enclosed by the second portion of the outer wall, wherein the second portion of the interior space is filled with a compressed gas, and wherein the driver comprises a valve in the mounting element that is operated by the controller during each of the bounces to release a fraction of the compressed gas into the first portion of the interior space.

14. The robot of claim 13, wherein the body is spherical and wherein the interior space is filled with a volume of gas to inflate the body to an outer diameter in a predefined range.

15. The robot of claim 13, wherein the elastic material comprises rubber.

16. The robot of claim 13, further comprising a battery supported by the mounting element in the interior space and providing power to the driver and the controller.

17. A robotic bouncing ball, comprising:
a hollow body including an outer wall defining an interior space, wherein the outer wall comprises an elastic material;
a volume of gas contained in the interior space to inflate the hollow spherical body to an outer diameter within a predefined range of outer diameters;
a linear actuator positioned within the interior space;
a connector rod connecting the linear actuator with an inner surface of a top portion of the outer wall; and
a controller positioned within the interior space and operating the linear actuator, during bouncing operations of the robotic bouncing ball, to repeatedly apply a deforming force to the top portion and to release the deforming force through linear movement of the connector rod, whereby the hollow spherical body moves vertically via a series of bounces in which an outer surface of the outer wall is separated from a support surface.

18. The robotic bouncing ball of claim 17, wherein the body is spherical in shape and wherein the controller is adapted to sense or determine a bottom of a set of the bounces and to synchronize the release of the deforming force with the sensed or determined bottom.

19. The robotic bouncing ball of claim 17, wherein the controller adjusts an angular orientation of the linear actuator in the interior space such that the linear movement is vertical or at an offset angle from vertical to allow steering of the hollow spherical body vertically and horizontally during the bounces.

20. The robotic bouncing ball of claim 17, further comprising a ballast element coupled to the linear actuator opposite the connector rod, wherein the ballast element has a weight greater than a weight of the hollow spherical body.

21. The robotic bouncing ball of claim 17, wherein the deforming force has a magnitude great enough to move the top portion, at a connection point between the connector rod and the outer wall, a distance greater than 0.5 inches toward a center of the interior space.

22. A robot with bounce-based locomotion on a support surface, comprising:
- a spherically-shaped body comprising an outer wall comprising an elastic material and enclosing an interior space, wherein the interior space contains a volume of gas inflating the spherically-shaped body to at least a predefined minimum outer diameter;
- a driver positioned within the interior space of the spherically-shaped body; and
- a controller generating control signals during an operating period to operate the driver to alternate between applying a force upon a first portion of the outer wall and releasing the force, wherein, in response, the body moves with a plurality of bounces and wherein the body reaches a height, within a predefined range of heights, above the support surface.

23. The robot of claim 22, wherein the controller further operates the driver to apply a second force upon a second portion of the outer wall spaced apart from the first portion and wherein the first and second forces are synchronized with each other or with a bottom portion of one or more of the bounces.

24. The robot of claim 22, wherein the driver comprises a connecting rod attached to the outer wall in the first portion and further comprises a linear actuator moving the connecting rod along a linear path to apply and release the first force, wherein the robot further comprises a weight supported in the interior space distal from the first portion and opposite the connecting rod, and wherein the body is steered in a plurality of directions relative to the support surface by the controller selectively shifting the weight or the linear actuator.

25. The robot of claim 22, further comprising a mounting element in the interior space supporting the driver, wherein the mounting element comprises a circular disk with an outer edge mated to an inner surface of the outer wall, and wherein the driver comprises a spring moved, during the bounces, toward and away from the circular disk toward the outer wall by the driver.

26. A robot with bounce-based locomotion on a support surface, comprising:
- a body comprising an outer wall enclosing an interior space, wherein the outer wall comprises a first portion formed of an elastic material;
- a driver supported by a mounting element within the interior space of the body; and
- a controller generating control signals to operate the driver to apply a first force upon the first portion of the outer wall of the body,
- wherein the body bounces at least in a vertical direction through a range of heights above the support surface, and
- wherein the driver comprises a connecting rod attached to the outer wall in the first portion and further comprises a linear actuator moving the connecting rod along a linear path to apply the first force.

27. The robot of claim 26, wherein the body is spherical and wherein the interior space is filled with a volume of gas to inflate the body to an outer diameter in a predefined range.

28. The robot of claim 26, wherein the elastic material comprises rubber.

29. The robot of claim 26, further comprising a battery supported by the mounting element in the interior space and providing power to the driver and the controller.

30. The robot of claim 26, further comprising a weight supported on the mounting element distal from the first portion and opposite the connecting rod and wherein the body is steered in a horizontal direction relative to the support surface by the controller selectively shifting the weight or rotating an angle of the linear actuator.

* * * * *